US010955393B2

(12) United States Patent
Sabolis et al.

(10) Patent No.: US 10,955,393 B2
(45) Date of Patent: Mar. 23, 2021

(54) GAS CHROMATOGRAPH DEVICE WITH REMOVABLE COLUMN HOLDER AND METHOD OF USE THEREOF

(71) Applicant: CEM Corporation, Lucidity Division, Matthews, NC (US)

(72) Inventors: Alyssa Whitney Sabolis, Weddington, NC (US); Michael John Collins, Jr., Huntersville, NC (US); Michael Craig Davis, Tega Cay, SC (US); Daniel Charles Scheid, Indian Trail, NC (US); Brian Thomas Unites, Shelby, NC (US); Richard Michael Chapman, Fort Mill, SC (US)

(73) Assignee: CEM CORPORATION, LUCIDITY DIVISION, Matthews, NC (US)

( * ) Notice: Subject to any disclaimer, the term of this patent is extended or adjusted under 35 U.S.C. 154(b) by 216 days.

(21) Appl. No.: 16/047,215

(22) Filed: Jul. 27, 2018

(65) Prior Publication Data

US 2019/0033269 A1 Jan. 31, 2019

Related U.S. Application Data

(60) Provisional application No. 62/537,803, filed on Jul. 27, 2017.

(51) Int. Cl.
| | |
|---|---|
| *G01N 30/60* | (2006.01) |
| *G01N 30/18* | (2006.01) |
| *G01N 30/30* | (2006.01) |
| *G01N 30/86* | (2006.01) |
| *G01N 30/88* | (2006.01) |
| *G01N 30/02* | (2006.01) |

(52) U.S. Cl.
CPC ......... *G01N 30/6047* (2013.01); *G01N 30/18* (2013.01); *G01N 30/30* (2013.01);
(Continued)

(58) Field of Classification Search
CPC .... G01N 30/6047; G01N 30/18; G01N 30/30; G01N 30/8696; G01N 30/88;
(Continued)

(56) References Cited

U.S. PATENT DOCUMENTS

| 4,226,119 A | 10/1980 | Buser |
| 4,432,225 A | 2/1984 | Hayes et al. |

(Continued)

FOREIGN PATENT DOCUMENTS

EP 0985928 A1 3/2000

OTHER PUBLICATIONS

International Search Report and Written Opinion dated Sep. 25, 2018 for corresponding PCT/2018/044185.

*Primary Examiner* — Suman K Nath
(74) *Attorney, Agent, or Firm* — Jeffrey C. Watson; Mathew L. Grell; Grell & Watson Patent Attorneys LLC

(57) ABSTRACT

A gas chromatograph with a removable column holder includes a column and a removable column holder. The column is configured for gas chromatography. The removable column holder houses the column. The removable column holder is configured to be removable from the gas chromatograph device with the column. The removable column holder houses only the column. The removable column holder is configured to allow removing and interchanging of the column within the removable column holder. The removable column holder is configured to protect the column within the column holder from mechanical damage and contamination due to handling. The removable column holder is configured to allow a user to install the column into the gas chromatograph without the need for tools. The removable column holder is also configured to reduce the possibility of error when installing the column.

19 Claims, 20 Drawing Sheets

(52) U.S. Cl.
CPC ....... G01N 30/606 (2013.01); G01N 30/8696 (2013.01); G01N 30/88 (2013.01); *G01N 30/6026* (2013.01); *G01N 30/6091* (2013.01); *G01N 2030/025* (2013.01); *G01N 2030/185* (2013.01); *G01N 2030/3084* (2013.01); *G01N 2030/8804* (2013.01)

(58) Field of Classification Search
CPC ............. G01N 30/606; G01N 30/6026; G01N 30/6091; G01N 2030/185; G01N 2030/3084; G01N 2030/8804; G01N 2030/025
See application file for complete search history.

(56) References Cited

U.S. PATENT DOCUMENTS

| | | |
|---|---|---|
| 4,469,601 A | 9/1984 | Beaver et al. |
| 4,548,498 A | 10/1985 | Folestad et al. |
| 5,298,225 A | 3/1994 | Higdon |
| 5,437,179 A | 8/1995 | Wiegand et al. |
| 5,589,630 A | 12/1996 | Wiegand et al. |
| 5,601,785 A * | 2/1997 | Higdon ............... G01N 30/6039 210/198.2 |
| 6,530,260 B1 * | 3/2003 | Mustacich ............ G01N 30/30 210/198.2 |
| 6,701,774 B2 | 3/2004 | Srinivasan et al. |
| 7,281,408 B2 | 10/2007 | Srinivasan et al. |
| 7,928,370 B2 | 4/2011 | Amirav et al. |
| 8,132,443 B2 | 3/2012 | McGill et al. |
| 8,845,794 B2 | 9/2014 | Klee |
| 2002/0155033 A1 | 10/2002 | Strand et al. |
| 2006/0283324 A1 | 12/2006 | Roques |
| 2012/0160690 A1 * | 6/2012 | Jarrell ................ G01N 30/6091 204/601 |
| 2013/0306563 A1 | 11/2013 | Blaschyk |
| 2019/0033271 A1 * | 1/2019 | Sabolis .................. G01N 30/30 |

* cited by examiner

GAS CHROMATOGRAPH DEVICE WITH REMOVABLE COLUMN HOLDER AND METHOD OF USE THEREOF

CROSS-REFERENCE TO RELATED APPLICATIONS

This application claims benefit of priority application, U.S. Provisional Ser. No. 62/537,803 filed on Jul. 27, 2017 entitled "Gas Chromatograph (GC) With At Least A Removable Column Holder, Positioning System for The Inlet Liner And The Column, Column Recognition Technology, Inductively Heated Column and/or Miniaturized Dimensions", which is incorporated herein by reference in its entirety.

FIELD OF THE DISCLOSURE

The present disclosure is directed to gas chromatographs, also known as GCs. More specifically, the instant disclosure is directed to a gas chromatograph or GC with a removable column holder.

BACKGROUND

Gas chromatography (GC) is a common type of chromatography used in analytical chemistry for separating and analyzing compounds that can be vaporized without decomposition. Gas chromatography is also sometimes known as vapor-phase chromatography (VPC), or gas-liquid partition chromatography (GLPC). Typical uses of GC may include testing the purity of a particular substance, or separating the different components of a mixture, and determining the relative amounts of different components of a mixture. As a result, in some situations, GC may be useful in identifying a compound. As another example, in preparative chromatography, GC can be used to prepare pure compounds from a mixture.

In gas chromatography, the mobile phase (or "moving phase") is a carrier gas, usually an inert gas such as helium or an unreactive gas such as nitrogen. Helium remains the most commonly used carrier gas in most common instruments, however, hydrogen is preferred for improved separations. The stationary phase is a microscopic layer of liquid or polymer on an inert solid support, inside a piece of tubing (typically glass or metal) called a column. The instrument used to perform gas chromatography is called a gas chromatograph (also known as an "aerograph" or "gas separator").

The gaseous compounds being analyzed interact with the walls of the column, which is coated with a stationary phase. This causes each compound to elute at a different time, known as the retention time of the compound. The comparison of retention times is what gives GC its analytical usefulness.

Gas chromatography is, in principle, like column chromatography (as well as other forms of chromatography, such as HPLC, TLC), but has several notable differences. First, the process of separating the compounds in a mixture is carried out between a liquid stationary phase and a gas mobile phase. On the other hand, in column chromatography the stationary phase is a solid and the mobile phase is a liquid. Therefore, the full name of the procedure is "gas—liquid chromatography", referring to the mobile and stationary phases, respectively. Second, the column, through which the gas phase passes, is located in an oven where the temperature of the gas can be controlled. On the other hand, standard column chromatography typically has no such temperature control. Finally, the concentration of a compound in the gas phase is solely a function of the vapor pressure of the gas. Gas chromatography is also like fractional distillation, since both processes separate the components of a mixture primarily based on boiling point (or vapor pressure) differences. However, fractional distillation is typically used to separate components of a mixture on a large scale, whereas GC can be used on a much smaller scale (i.e. microscale).

One problem that has been discovered with known gas chromatographs is their size, cost, and ease of use, as known gas chromatographs are typically laboratory grade. Currently, laboratory grade gas chromatographs are large expensive machines that require extensive training for operation. This leads to gas chromatographs being found mainly in academia or industrial labs. For example, in research universities, where each university may only have one gas chromatograph located in a designated area or even room, that is shared among many departments, thereby requiring users to schedule time with the gas chromatograph and its operator(s). This problem may be similar in most industrial labs as well. As such, to provide better access to GC, there is clearly a need to provide a gas chromatograph that is smaller, costs less, and is easier to use.

As an example, during the use of a gas chromatograph device, the column may need changing after a certain amount of uses and/or for various compounds desired for gas chromatography. The process of changing a column in standard gas chromatography is very complex and requires tools and delicate care. As such, changing the column takes a lot of time, training and can often times lead to damage to the column. For example, currently, most GC columns are attached to the injector port and the detector via compression fittings that require a wrench to engage and disengage. The user must open the front of the oven and then reach inside with a wrench to disengage and engage the column. Care must be taken during this process not to burn yourself and not to touch the tips of the column with your bare fingers which would introduce contamination into the system. Care must also be taken not to break the delicate column but also to engage the fittings firmly enough with a wrench to ensure air tight seals. Frequently the entire system must be leak checked after installing a column to ensure leak free installation. Also, specific user knowledge is required to understand exactly how far to install the column into the injector port and the detector otherwise results can be inconsistent and poor. Therefore, there is clearly a need to provide a gas chromatograph device with a column that is easier and faster to change.

The instant disclosure is designed to address at least certain aspects of the problems or needs discussed above by providing a gas chromatograph with at least a removable column holder.

SUMMARY

Accordingly, in one aspect, the present disclosure embraces a gas chromatograph device that includes a removable column holder. The gas chromatograph device with a removable column holder may generally include a column and a removable column holder. The column is configured for gas chromatography. The removable column holder may house the column. The removable column holder may be configured to be removable from the gas chromatograph device with the column.

One feature of the instant gas chromatograph device with a removable column holder may be that the removable column holder may house only the column.

Another feature of the instant gas chromatograph device with a removable column holder may be that the removable column holder may be configured to allow removing and interchanging of the column within the removable column holder.

Another feature of the instant gas chromatograph device with a removable column holder may be that the removable column holder may be configured to protect the column within the removable column holder from mechanical damage and contamination due to handling.

Another feature of the instant gas chromatograph device with a removable column holder may be that the removable column holder can be configured to allow a user to install and/or remove the column into and out of the gas chromatograph without the need for tools.

Another feature of the instant gas chromatograph device with a removable column holder may be that the removable column holder can be configured to reduce the possibility of error when installing the column.

In select embodiments of the instant gas chromatograph device with a removable column holder, the column in the removable column holder may include an injector port pin and a detector pin. The injector port pin may be connected to a first tip of the column at one end. The injector port pin may be configured to provide a first air tight seal to an injector port of the gas chromatograph device. The detector pin may be connected to a second tip of the column at its other end. The detector pin may be configured to provide a second air tight seal to a detector of the gas chromatograph device. Wherein the removable column holder may include a sealing system that allows gas flow from the injector port into the column via the injector port pin, and from the column into the detector via the detector pin configured to allow the detection of compounds that may only be present in low levels.

In select embodiments of the instant gas chromatograph device with a removable column holder, the removable column holder may include a housing. The housing may be configured to contain the column in the removable column holder. The housing may contain the column inside with the injector port pin and the detector pin protruding therefrom. Wherein, the housing may be configured to keep a user from contaminating the first tip or the second tip of the column.

In select embodiments of the instant gas chromatograph device with a removable column holder, the injector port pin and the detector pin may protrude from a same side of the housing. Whereby, when the removable column holder is inserted into the gas chromatograph device, the injector port pin and the detector pin may seal to the injector port and the detector, respectively, at the same time.

In select embodiments of the instant gas chromatograph device with a removable column holder, a cartridge slot may be included. The cartridge slot may be configured to receive the removable column holder with the column.

In select embodiments of the instant gas chromatograph device with a removable column holder, a locking mechanism may be included. The locking mechanism may be configured for securing the removable column holder with the column inside the cartridge slot. In select embodiments, the locking mechanism may provide a force to the injector port pin and the detector pin configured for creating the first and second air tight seals between the injector port and the detector, respectively. In select embodiments, the locking mechanism may include a mechanical latch with a lever configured to engage the cartridge slot for securing the removable column holder into the cartridge slot with the force to engage the sealing system.

One feature of the instant gas chromatograph device with a removable column holder may be that the sealing system may include springs on each of the injector port pin and the detector pin to engage the injector port and the detector independently to overcome tolerance issues between different holders and columns. In select embodiments, these springs may be a flexible washer or gasket for sealing to the injector port and detector, respectively In select embodiments of the instant gas chromatograph device with a removable column holder, a detector O-ring and an injector O-ring may be included. The detector O-ring may be configured for sealing the detector pin of the column to the detector when the removable column holder is inserted and locked in the cartridge slot. Likewise, the injector O-ring may be configured for sealing the injector port pin of the column to the injector port when the removable column holder is inserted and locked in a cartridge slot.

Another feature of the instant gas chromatograph device with a removable column holder may be that the detector O-ring and the injector O-ring are configured to seal to the injector port and the detector, respectively, in a face sealing arrangement or a plug sealing arrangement. In select embodiments, the injector port pin and the detector pin may include tapered features configured for sealing to the injector port and detector, respectively.

In select embodiments of the instant gas chromatograph device with a removable column holder, the housing may include a plurality of holes, vents, slots, or combinations thereof configured for air flow through the column.

In select embodiments of the instant gas chromatograph device with a removable column holder, the housing may include a tab configured for gripping the removable column holder to insert or remove the removable column holder from the cartridge slot. The tab may protrude from an opposite side of the housing as the injector port pin and the detector pin.

In select embodiments of the instant gas chromatograph device with a removable column holder, the gas chromatograph device may include a frame, a cover, an injector port, gas fittings in fluid communication with the injector port, a detector; at least one vent hole in the cover configured for providing air flow through the column via at least one fan, or combinations thereof.

In another aspect, the instant disclosure embraces a removable column holder for a gas chromatograph device. The removable column holder may generally include a column configured for gas chromatography. The column may include an injector port pin and a detector pin. The injector port pin may be connected to a first tip of the column at one end. The injector port pin may be configured to provide a first air tight seal to an injector port of the gas chromatograph device. The detector pin may be connected to a second tip of the column at its other end. The detector pin may be configured to provide a second air tight seal to a detector of the gas chromatograph device. As such, the removable column holder may house the column and may be configured to be removable from the gas chromatograph device with the column.

In select embodiments, the removable column holder may include a housing configured to contain the column in the removable column holder. The housing may contain the column inside with the injector port pin and the detector pin protruding therefrom. Wherein, the injector port pin and the detector pin may protrude from the same side of the housing.

Whereby, when the removable column holder is inserted into the gas chromatograph device, the injector port pin and the detector pin may seal to the injector port and the detector, respectively, at the same time.

In another aspect, the instant disclosure embraces a method of changing a column of a gas chromatograph device. The instant method of changing a column of a gas chromatograph device may generally include providing the removable column holder in any of the various embodiments shown and/or described herein. As such, the removable column holder provided may house the column and may be configured to be removable from the gas chromatograph device with the column. As a result, the instant method of changing a column of a gas chromatograph device may further include the step of removing the removable column holder with the column from the gas chromatograph device.

In select embodiments of the instant method of changing a column of a gas chromatograph device, wherein: the column including an injector port pin connected to a first tip of the column at one end, the injector port pin is configured to provide a first air tight seal to an injector port of the gas chromatograph device, and a detector pin connected to a second tip of the column at its other end, the detector pin is configured to provide a second air tight seal to a detector of the gas chromatograph device; the removable column holder including a sealing system that allows gas flow from the injector port into the column via the injector port pin, and from the column into the detector via the detector pin configured to allow the detection of compounds that may only be present in low levels; and the removable column holder including a housing configured to contain the column in the removable column holder, where the housing containing the column inside with the injector port pin and the detector pin protruding therefrom, wherein the injector port pin and the detector pin protruding from the same side of the housing; the instant method may further include the steps of: inserting the removable column holder with a new column into a cartridge slot of the gas chromatograph device, where the injector port pin and the detector pin sealing to the injector port and the detector, respectively, at the same time; and locking the removable column holder with the column in the cartridge slot via a locking mechanism configured for securing the removable column holder with the column inside the cartridge slot, where the locking mechanism providing a force to the injector port pin and the detector pin configured for creating the first and the second air tight seals between the injector port and the detector, respectively.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

Figure 1:
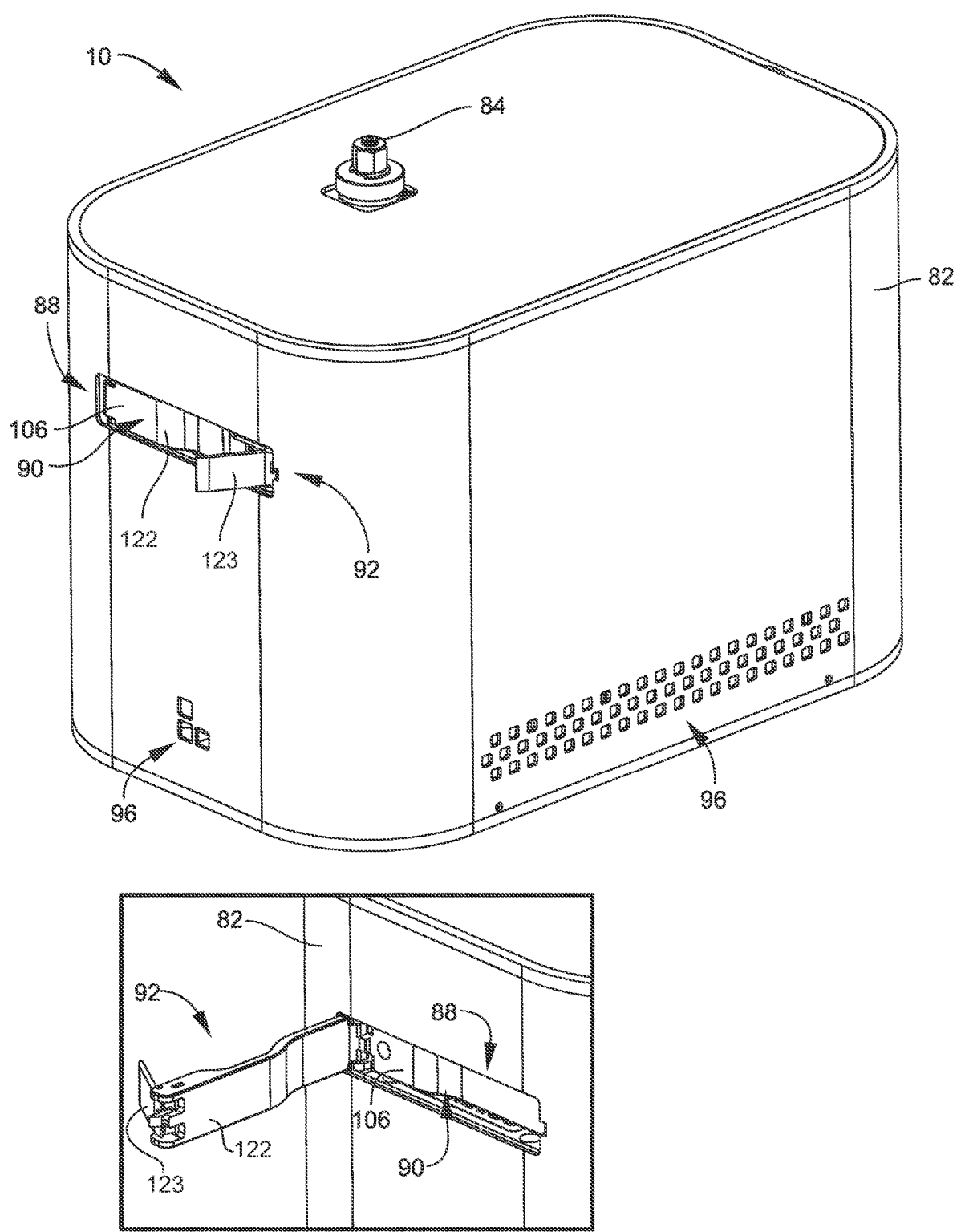
FIG. 1 is perspective front top view of select embodiments of the gas chromatograph device according to the instant disclosure with the locking mechanism locked and unlocked below.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-26, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-25, in a possibly preferred embodiment, the present disclosure overcomes the above-mentioned disadvantages and meets the recognized need for such an apparatus or method by providing of gas chromatograph device 10 with removable column holder 90. Gas chromatograph device 10 may be referred to herein as gas chromatograph, miniature gas chromatograph, miniature GC, mini gas chromatograph, mini GC, or just GC. Gas chromatograph device 10 may be for gas chromatography (GC), or may be used in analytical chemistry for separating and analyzing compounds that can be vaporized without decomposition. As such, gas chromatograph device 10 may be used for, but is not limited to, testing the purity of a particular substance, or separating the different components of a mixture, and determining the relative amounts of different components of a mixture. As a result, in some situations, gas chromatograph device 10 may be useful in identifying a compound. As another example, in preparative chromatography, gas chromatograph device 10 can be used to prepare pure compounds from a mixture.

Gas chromatograph device 10 may be provided with unique features, including, but not limited to, at least removable column holder 90, positioning system for the inlet liner and the column 12, column recognition technology for the column 12, inductive heating of column 12, and/or miniaturized dimensions (see FIGS. 1-16). However, although the instant disclosure may be directed to the removable column holder 90 aspect of gas chromatograph device 10, the disclosure is not so limited, and gas chromatograph device 10 may include these other unique features as well.

In general, the instant disclosure is directed to gas chromatograph device 10 that includes removable column holder 90. As such, gas chromatograph device 10 may generally include column 12 that is configured for gas chromatography, and removable column holder 90. Removable column holder 90 may be for housing or holding column 12. Removable column holder 90 may be configured to be removable from gas chromatograph device 10 with column 12. As such, when removable column holder 90 is removed from gas chromatograph device 10, column 12 is removed with removable column holder 90 from gas chromatograph device 10. One feature of the instant gas chromatograph device 10 with removable column holder 90 may be that the removable column holder 90 may house only column 12. In other words, removable column holder 90 may not include or house any other parts or features of gas chromatograph device 10. As such, when removable column holder 90 is removed from gas chromatograph device 10, only column 12 and the components of removable column holder 90 may be removed from gas chromatograph device 10. Another feature of gas chromatograph device 10 with removable column holder 90 may be that removable column holder 90 may be configured to allow removing and interchanging of column 12 within removable column holder 90. This may be a simple process, where removable column holder 90 is slit out of cartridge slot 88, where column 12 can be easily accessed for exchanging with another column 12. This may include changing the column within removable column holder 90 or using a new removable column holder 90 with a new column 12. As such, another feature of gas chromatograph device 10 with removable column holder 90 may be that removable column holder 90 can be configured to allow a user to install or exchange a new column 12 into gas chromatograph device 10 without the need for tools. Another feature of gas chromatograph device 10 with removable column holder 90 may be that removable column holder 90 may be configured to protect column 12 within removable column holder 90 from mechanical damage and contamination due to handling. In other words, when removable column holder 90 with column 12 is removed from gas chromatograph device 10, removable column holder 90 may allow one to manipulate, store, transport, etc. column 12 in a safe environment because removable column holder 90 may protect column 12 from mechanical damage and contamination. Yet, another feature of gas chromatograph device 10 with removable column holder 90 may be that removable column holder 90 can be configured to reduce the possibility of error when installing column 12.

Column 12 may be included in removable column holder 90. Column 12 may be any column configured for chromatography and configured for insertion inside removable column holder 90. Column 12 may include first tip 99 at one end and second tip 101 at its other end. Injector port pin 98 may be connected to first tip 99 and detector pin 100 may be connected to second tip 101.

Housing 102 may be included with removable column holder 90 of gas chromatograph device 10. Housing 102 may be configured to contain column 12 in removable column holder 90. Housing 102 may contain column 12 inside with injector port pin 98 and detector pin 100 protruding therefrom. Wherein, housing 102 may be configured to keep a user from contaminating first tip 99 or second tip 101 of column 12. Injector port pin 98 and detector pin 100 may protrude from same side 118 of housing 102, like on the back side of housing 102 as shown in the Figures. Whereby, when removable column holder 90 is inserted into gas chromatograph device 10, injector port pin 98 and detector pin 100 may seal to injector port 84 and detector 94, respectively, at the same time. In select embodiments, housing 102 may include plurality of holes, vents, slots, or combinations thereof 104 configured for air flow through column 12. In other select embodiments, housing 102 may include tab 106 configured for gripping removable column holder 90 to insert or remove removable column holder 90 from cartridge slot 88. Tab 106 may protrude from opposite side 134 of housing 102 as injector port pin 98 and detector pin 100. Tab 106 of housing 102 may also allow a user to manipulate removable column holder 90 with column 12 without contaminating or damaging column 12.

Cartridge slot 88 may be included in gas chromatograph device 10. Cartridge slot 88 may be for positioning removable column holder 90 with column 12 inside gas chromatograph device 10. Cartridge slot 88 may be configured to position injector port pin 98 and detector pin 100 for sealing with injector port 84 and detector 94, respectively. Cartridge slot 88 may include a casing configured to receive removable column holder 90 with column 12. This casing may include a width, depth and height slightly larger than removable column holder 90, to allow removable column holder 90 to be slid in and out of cartridge slot 88. The casing of cartridge slot 88 my include an open end or holes or slots configured to receive injector port pin 98 and detector pin 100 to allow connection with injector port 84 and detector 94, respectively. This casing of cartridge slot 88 may include various holes, vents, slots, or combinations thereof for allowing air flow into column 12 inside removable column holder 90. For providing air flow around column 12, these various holes, vents, slots, etc. may, but are not required to, match up or align with the plurality of holes, vents, slots, or combinations thereof 104 of housing 102 of removable column holder 90. These various holes, vents, slots, etc. of cartridge slot 88 may include, but are not limited to, a hole for positioning heating element 16 of inductive heating source 14 around column 12, like below column 12, as shown in the Figures.

Locking mechanism 92 may be included with gas chromatograph device 10. Locking mechanism 92 may be configured for securing removable column holder 90 with column 12 inside cartridge slot 88 in gas chromatograph device 10. In select embodiments, locking mechanism 92 may provide force 120 on housing 102 of removable column holder 90. This force 120 on housing 102 may provide force to injector port pin 98 and detector pin 100 configured for creating first and second air tight seals 112 and 114 between injector port 84 and detector 94, respectively. As shown in the Figures, in select embodiments, locking mechanism 92 may include, but is not limited to, having mechanical latch 122 with lever 123 configured to engage cartridge slot 88 (or cover 82 or frame 80) for securing removable column holder 90 into cartridge slot 88 with force 120 to engage sealing system 116.

Sealing system 116 may be included with removable column holder 90 of gas chromatograph device 10. Sealing system 116 may be for sealing the respective ends (first tip 99 and second tip 101) of column 12 with injector port 84 and detector 94. Sealing system 116 may be configured to allow gas flow from injector port 84 into column 12 via injector port pin 98, and from column 12 into detector 94 via detector pin 100. Sealing system 116 may be configured to allow the detection of compounds that may only be present in low levels. In select embodiments of sealing system 116, injector port pin 98 may be connected to first tip 99 of column 12 at one end. Injector port pin 98 may be configured to provide first air tight seal 112 to injector port 84 of gas chromatograph device 10. Likewise, detector pin 100 may be connected to second tip 101 of column 12 at its other end. Detector pin 100 may be configured to provide second air tight seal 114 to detector 94 of gas chromatograph device 10. In select embodiments, sealing system 116 may include springs 124 on each of injector port pin 98 and detector pin 100 to engage injector port 84 and detector 94 independently to overcome tolerance issues between different removable column holders 90 and columns 12. In select embodiments, as shown in the Figures, springs 124 may be flexible washer or gasket 132 for sealing to injector port 84 and detector 94, respectively. In select embodiments, as shown in the Figures, detector O-ring 108 and injector O-ring 110 may also be included. Detector O-ring 108 may be configured for sealing detector pin 100 of column 12 to detector 94 when removable column holder 90 is inserted and locked in cartridge slot 88. Likewise, injector O-ring 110 may be configured for sealing injector port pin 98 of column 12 to injector port 84 when removable column holder 90 is inserted and locked in cartridge slot 88. Detector O-ring 108 and injector O-ring 110 may be configured to seal to detector 94 and injector port 84, respectively, in face sealing arrangement 126 (sealed on the top of the O-rings) and/or plug sealing arrangement 128 (sealed on the outer edges of the O-rings). In select embodiments, injector port pin 98 and detector pin 100 may include tapered features 130 configured for sealing or aiding in sealing to injector port 84 and detector 94, respectively.

An inductive heating source 14 may be included in gas chromatograph device 10. Inductive heating source 14 may be configured to directly or indirectly heat column 12. As disclosed herein, direct inductive heating of column 12 would be applying an inductive current directly to column 12 for heating column 12. On the other hand, as disclosed herein, indirect inductive heating of column 12 would be applying an inductive current to a material or device around column 12 for heating column 12. The inductive heating source 14 may include inductive heating element or coil 16. As such, the inductive heating element or coil 16 may be configured to induce current directly or indirectly in column 12. Wherein, column 12 in the gas chromatograph device 10 may be inductively heated via inductive heating source 14. One feature or benefit of the instant gas chromatograph device 10 may be that it does not require an oven to heat column 12. Prior to the instant disclosure, GC columns were hung in a convection oven that resides within the GC device. Thus, convection heating via air ovens and resistive elements has been the norm. However, these ovens require large spaces and thus take time to heat these spaces up. The instant disclosure of miniature gas chromatograph device 10 utilized inductive heating of column 12 and, thus, does not include an oven. This feature may reduce the time and space required for these convection heating ovens required for prior gas chromatograph devices. As a result, in one aspect, the instant disclosure is directed to gas chromatograph device 10 that has miniaturized dimensions or miniature gas chromatograph 10. Miniature gas chromatograph 10 may be a gas chromatograph that is smaller in size than known standard gas chromatographs.

Figure 2:
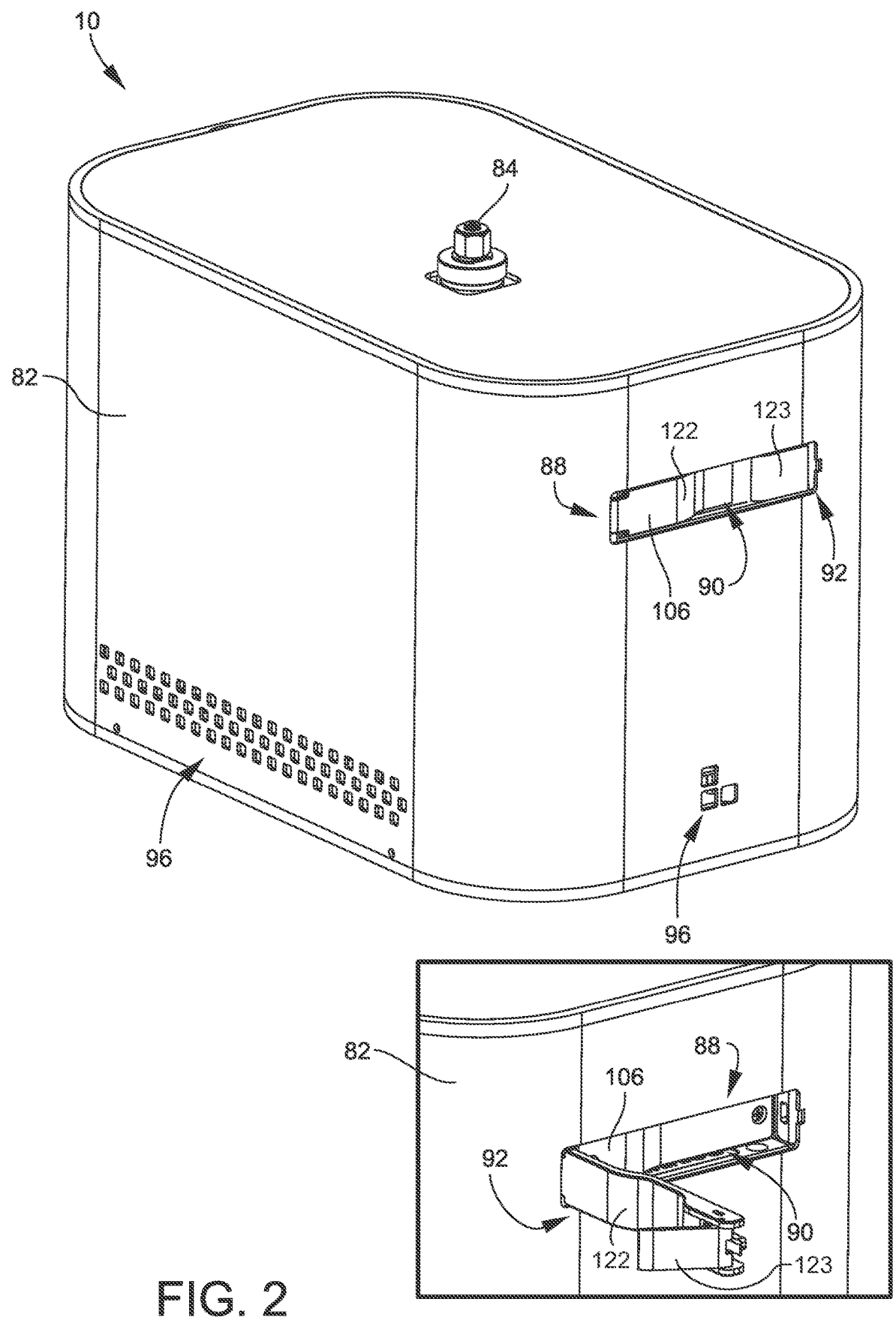
FIG. 2 is another perspective front top view of the gas chromatograph device of FIG. 1 from the other side with the locking mechanism locked and unlocked below.
Figure 3:
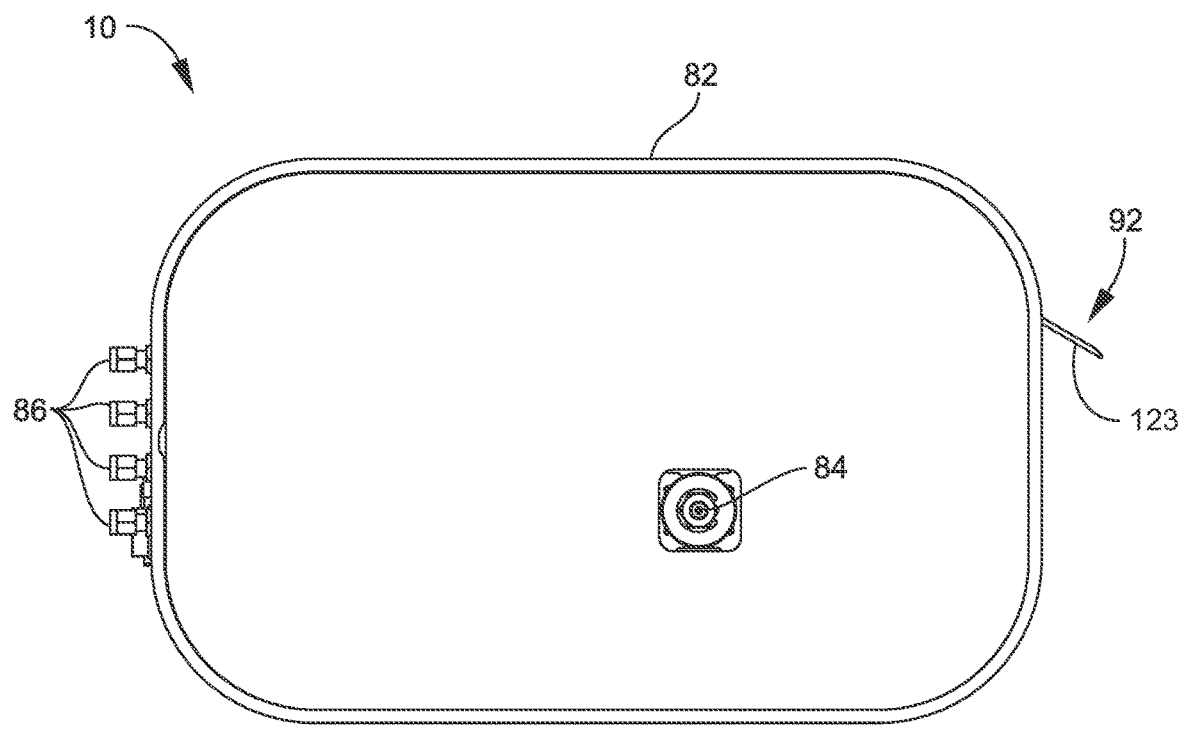
FIG. 3 is a top view of the gas chromatograph device of FIG. 1.
Figure 4:
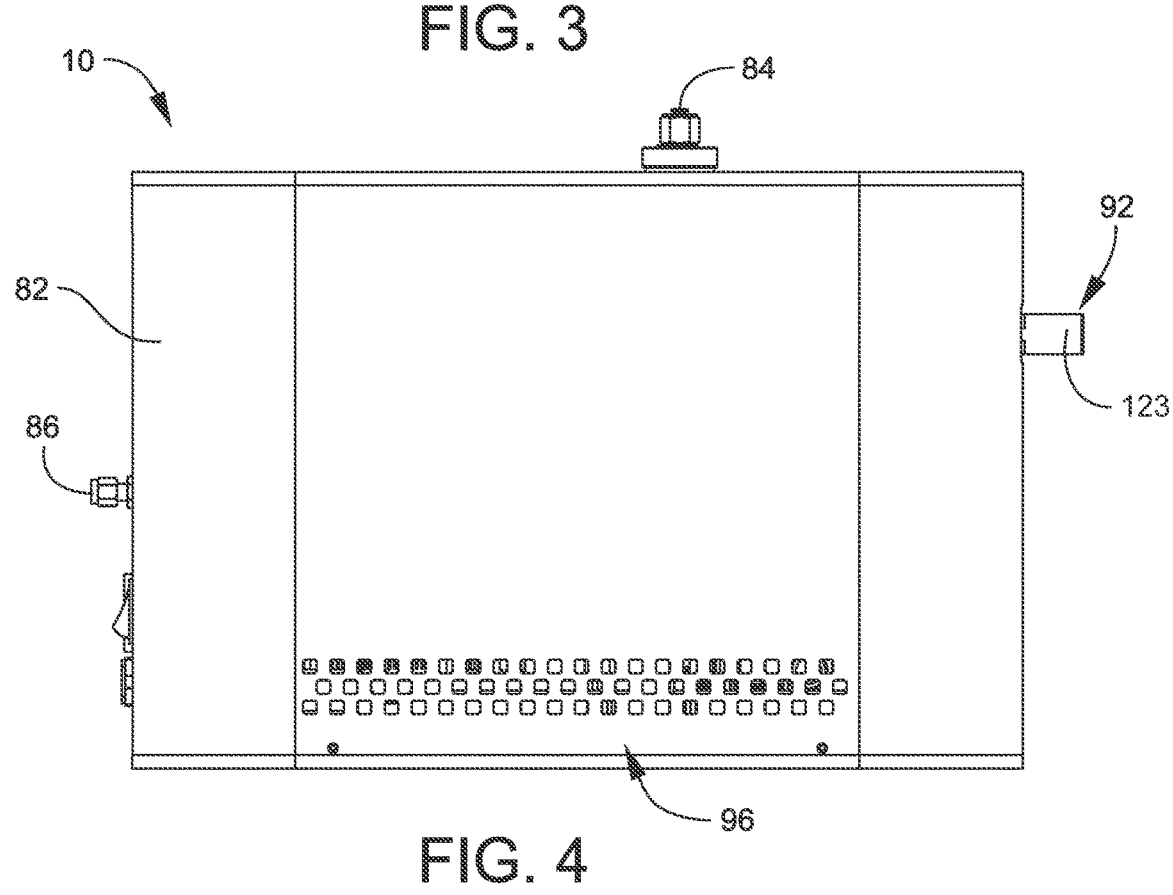
FIG. 4 is a left side view of the gas chromatograph device of FIG. 1.
Figure 5:
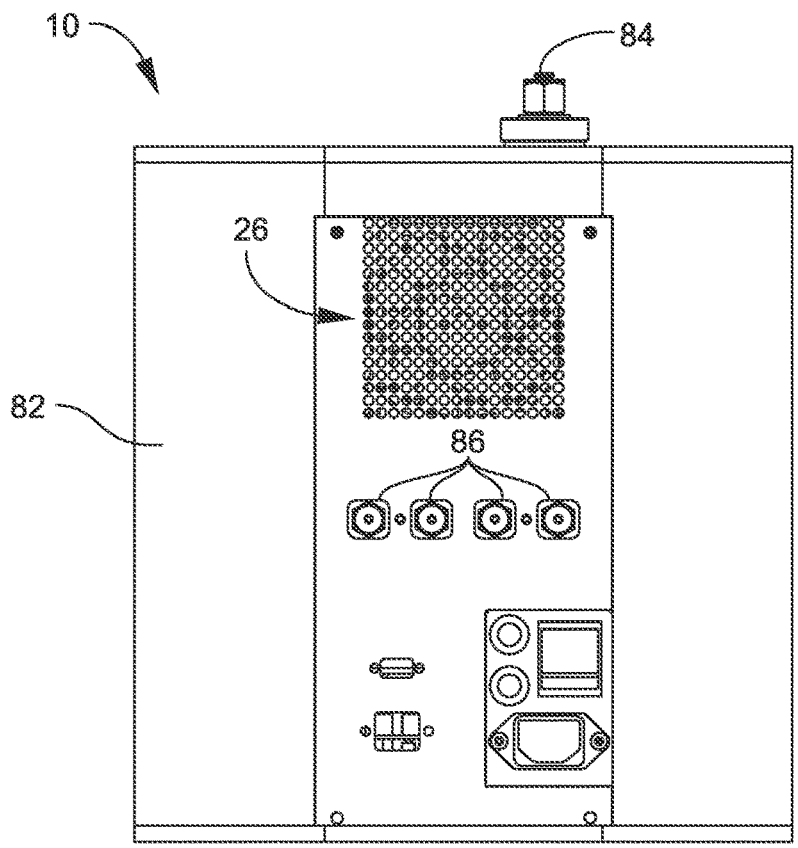
FIG. 5 is a rear view of the gas chromatograph device of FIG. 1.
Figure 6:
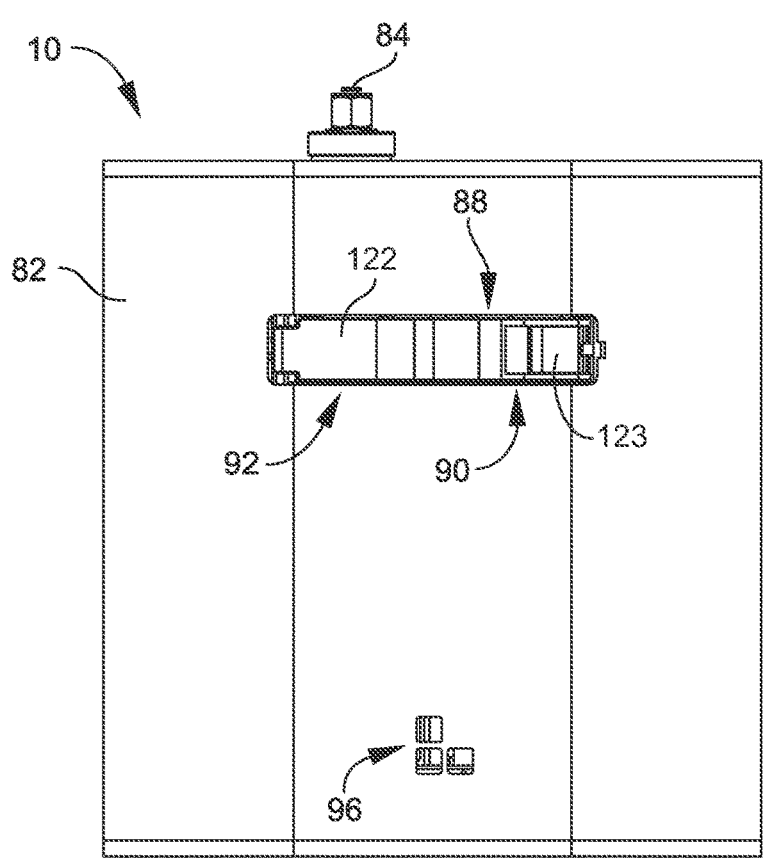
FIG. 6 is a front view of the gas chromatograph device of FIG. 1.
Figure 7:
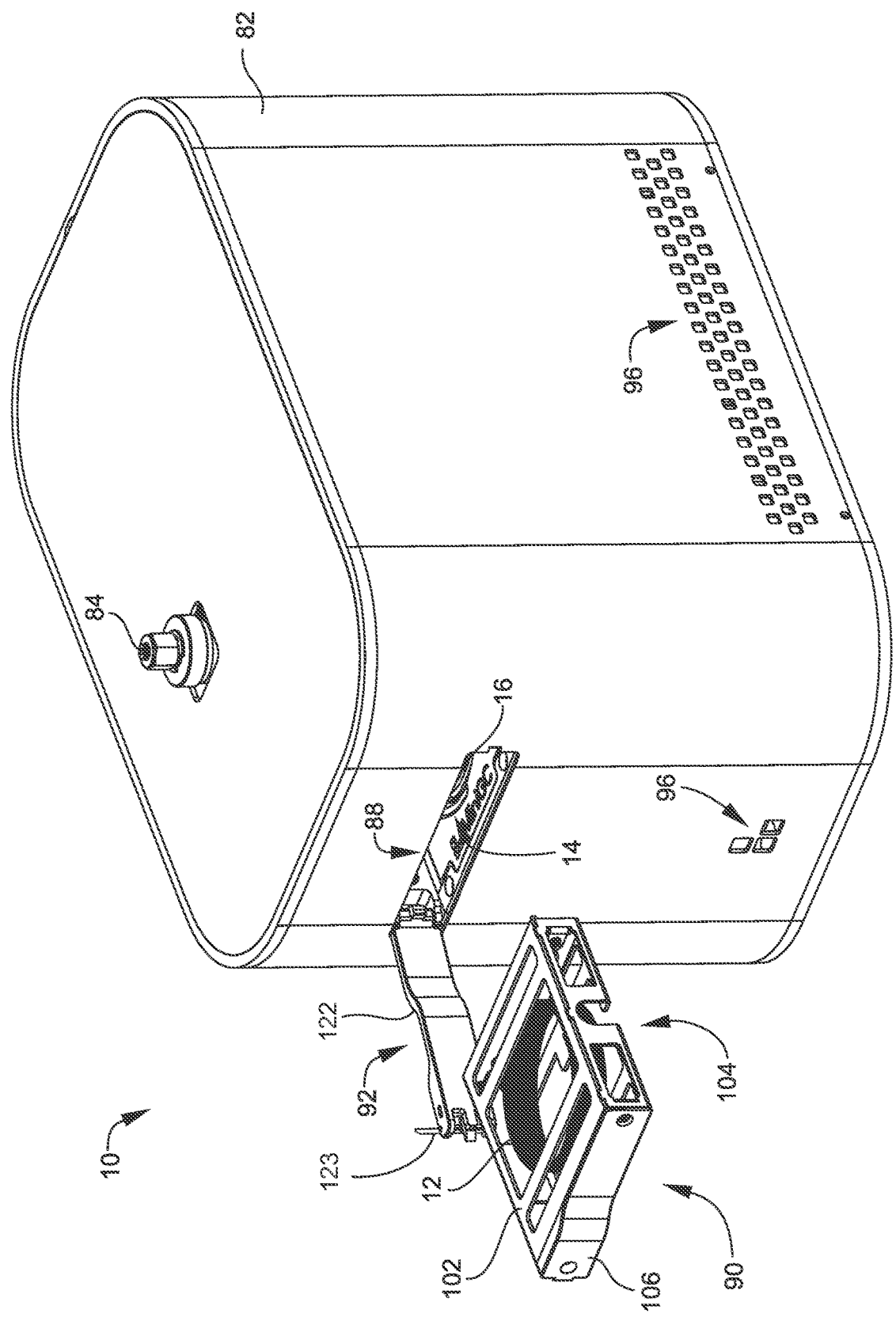
FIG. 7 is a perspective front top view of select embodiments of the gas chromatograph device according to select embodiments with the locking mechanism unlocked and the removable column holder partially removed.
Figure 8:
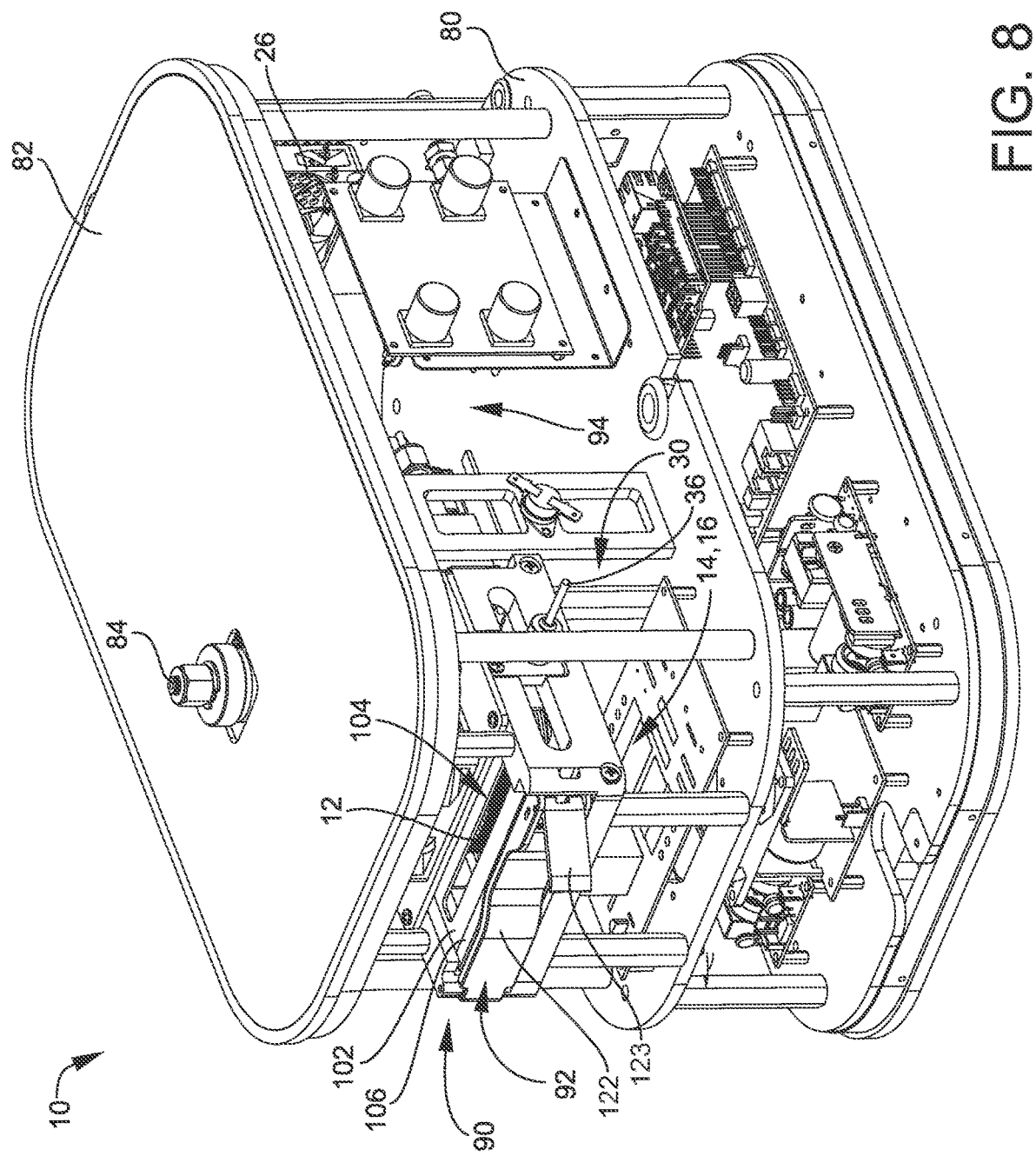
FIG. 8 is perspective front top view of select embodiments of the gas chromatograph device according to the instant disclosure with the cover removed.
Figure 9:
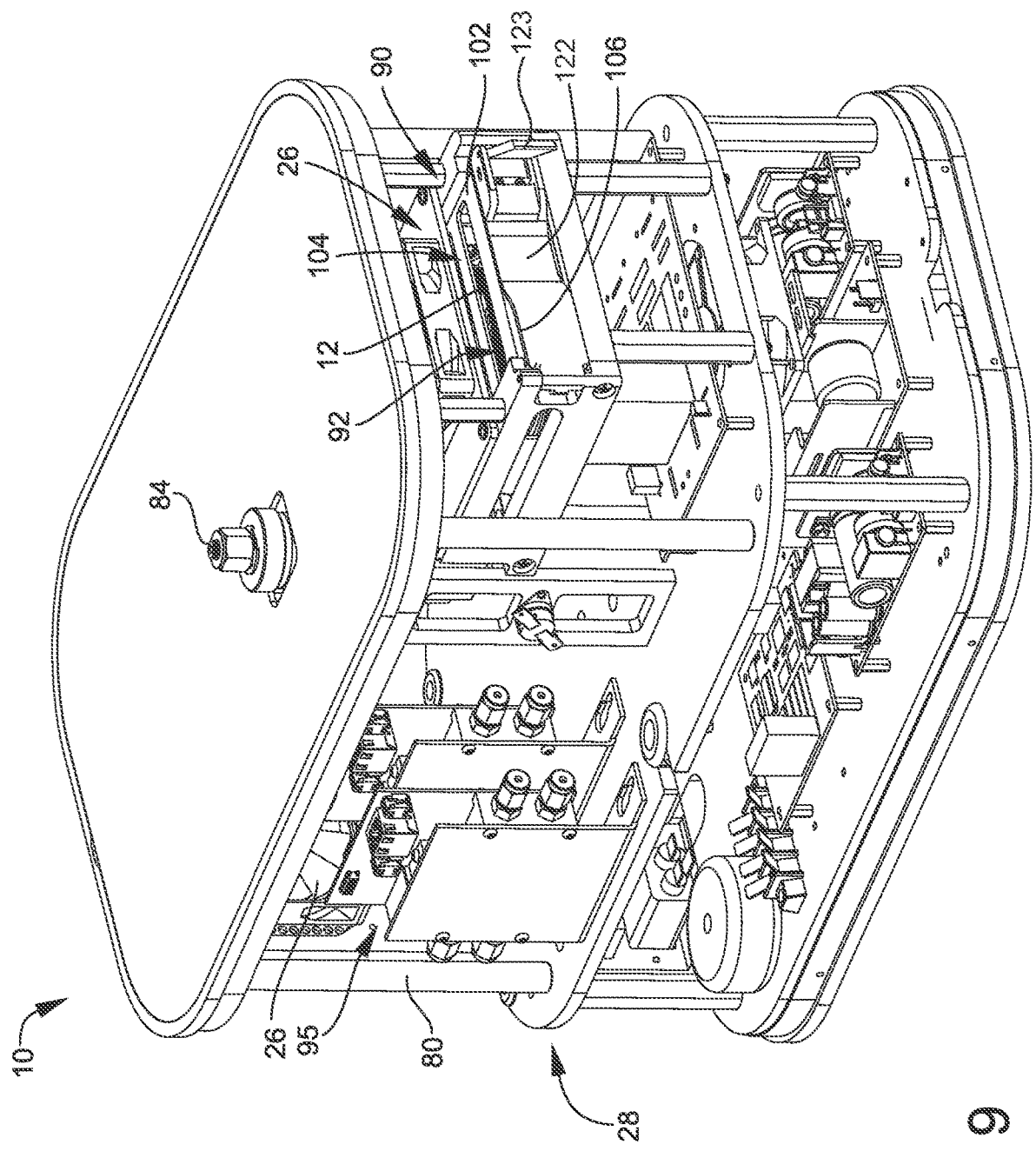
FIG. 9 is another perspective front top view of the gas chromatograph device of FIG. 8 from the other side.
Figure 10:
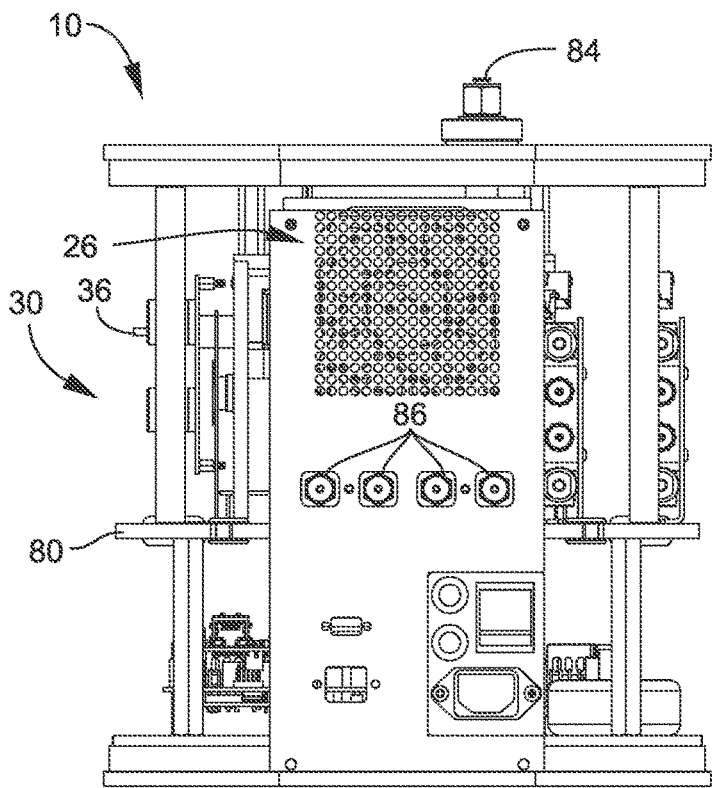
FIG. 10 is a rear view of the gas chromatograph device of FIG. 8.
Figure 11:
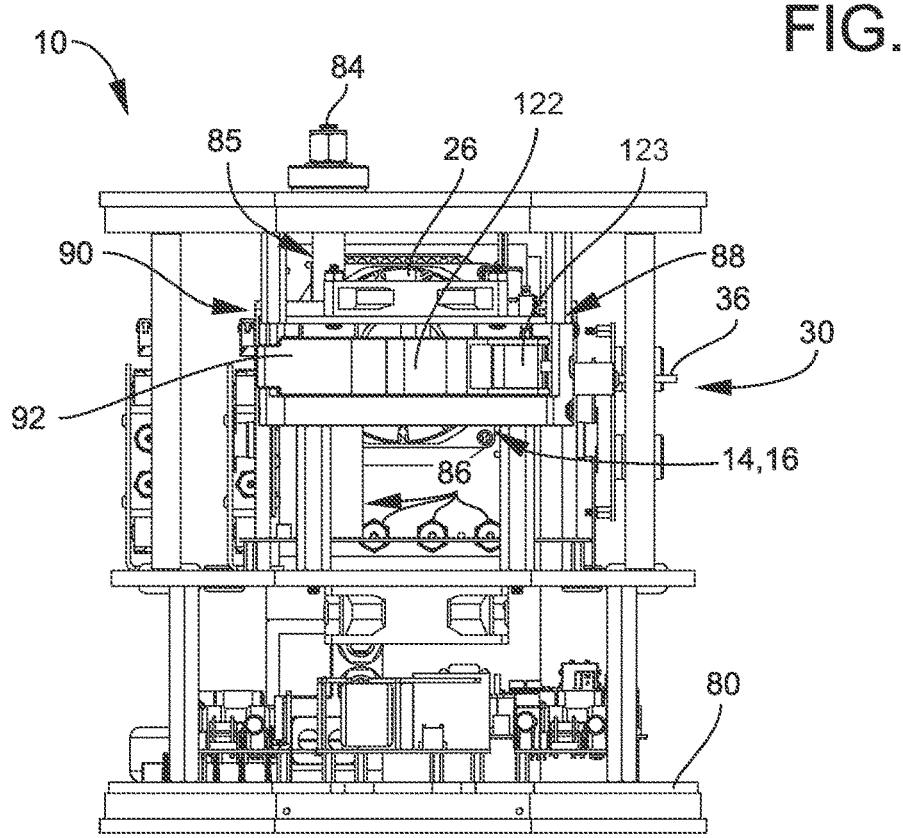
FIG. 11 is a front view of the gas chromatograph device of FIG. 8.
Figure 12:
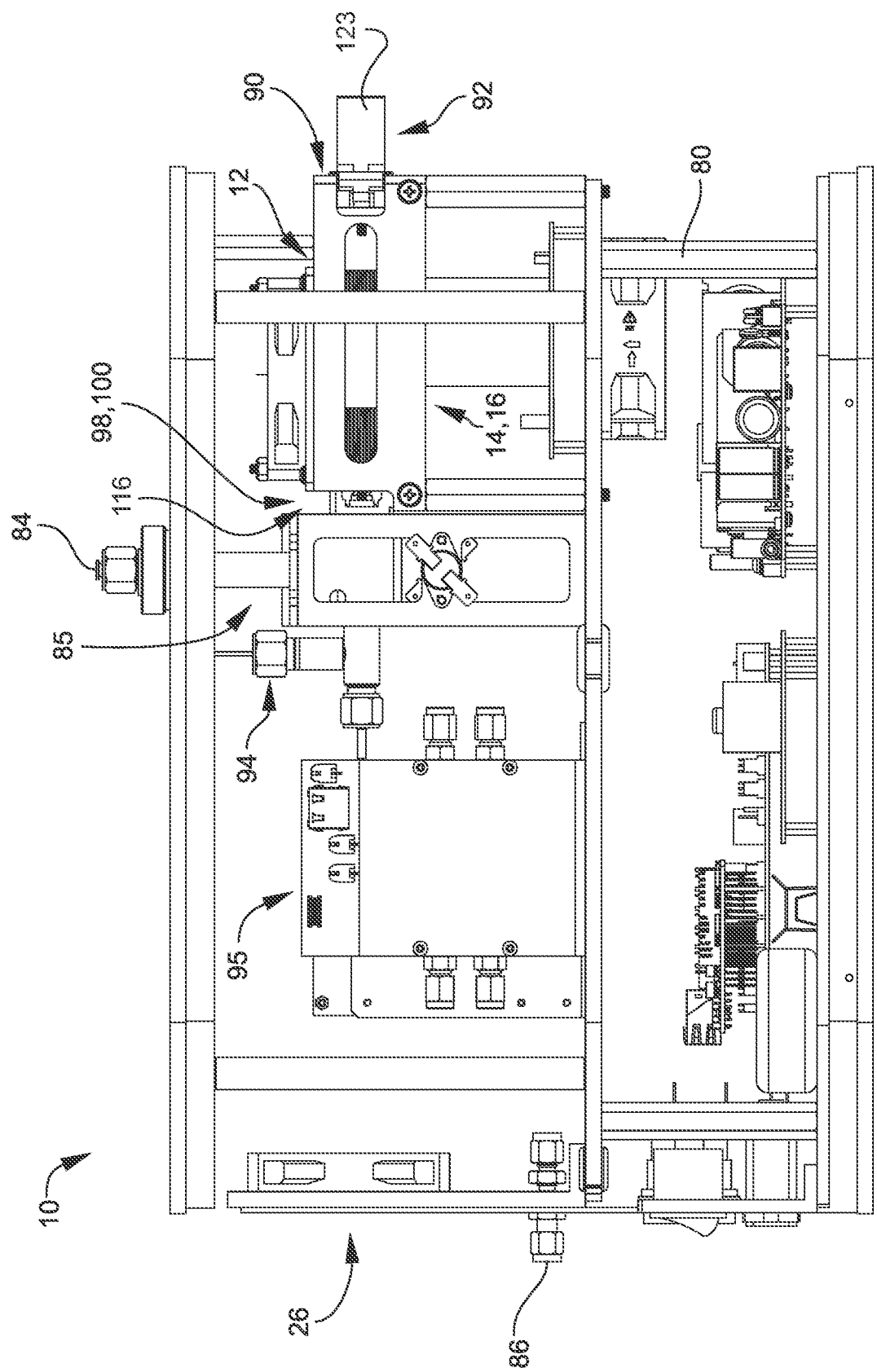
FIG. 12 is a left side view of the gas chromatograph device of FIG. 8.
Figure 13:
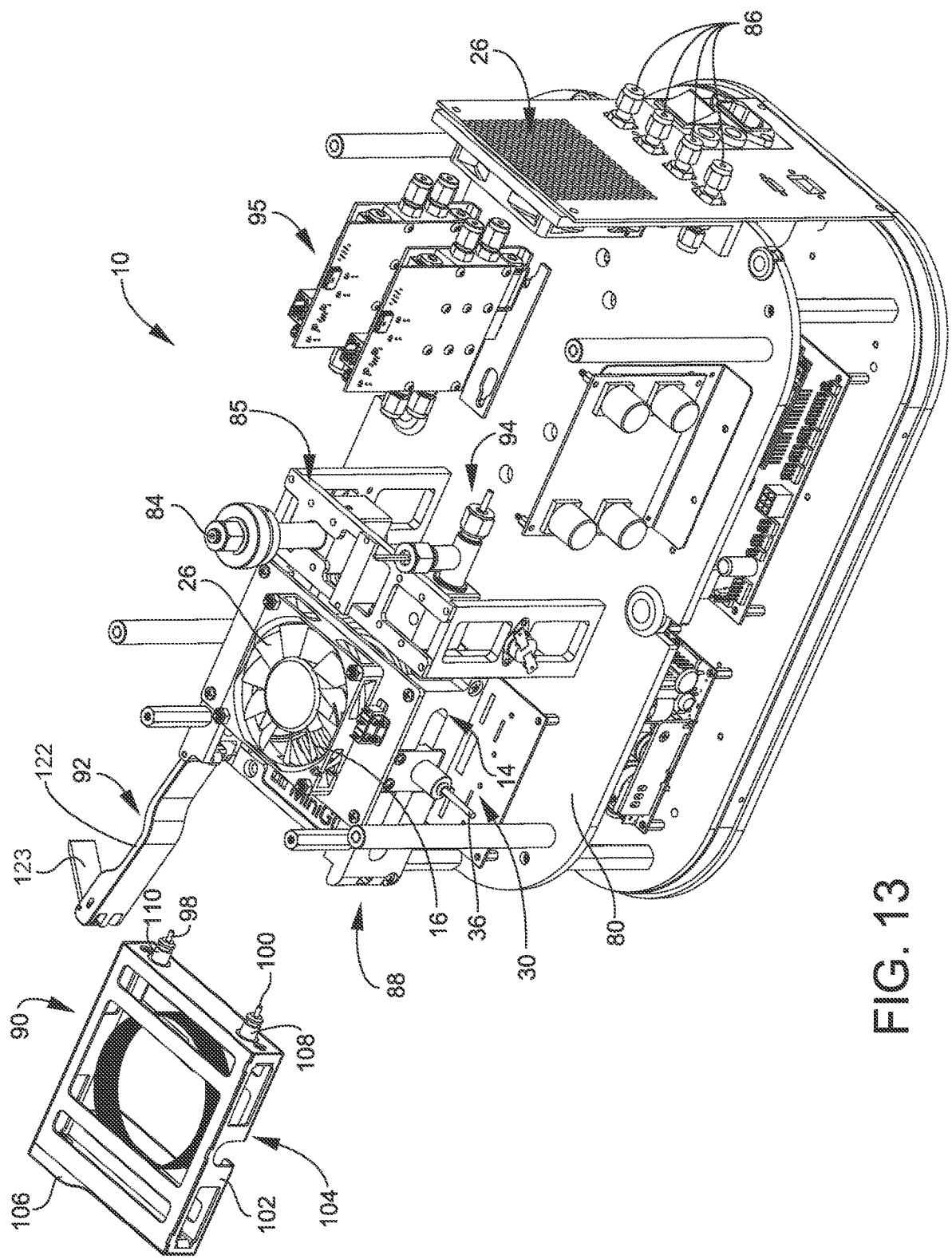
FIG. 13 is a perspective rear top view of select embodiments of the gas chromatograph device according to the instant disclosure without the cover and with the locking mechanism unlocked and the removable column removed.
Figure 14:
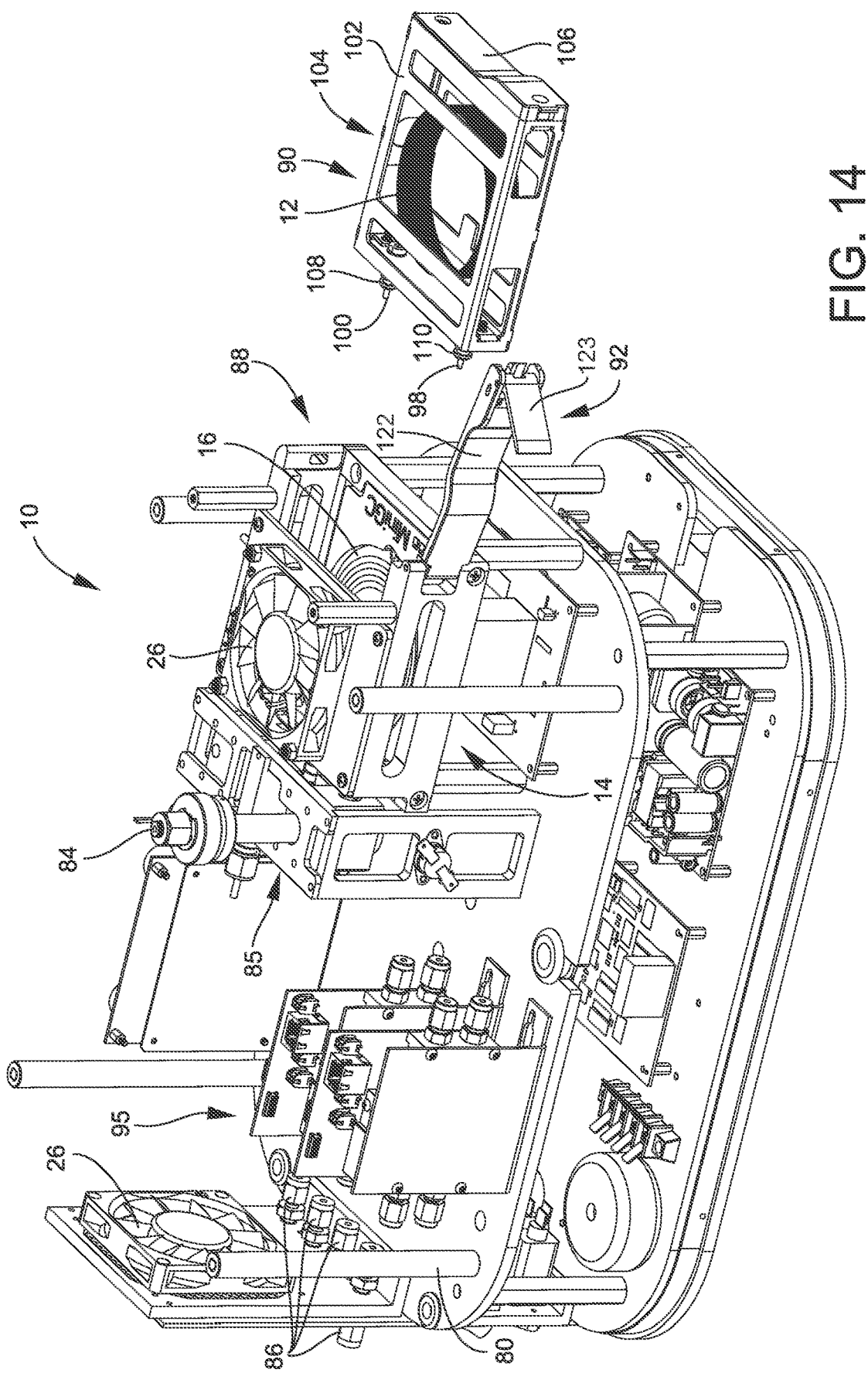
FIG. 14 is a perspective front top view of the gas chromatograph device of FIG. 13.
Figure 15:
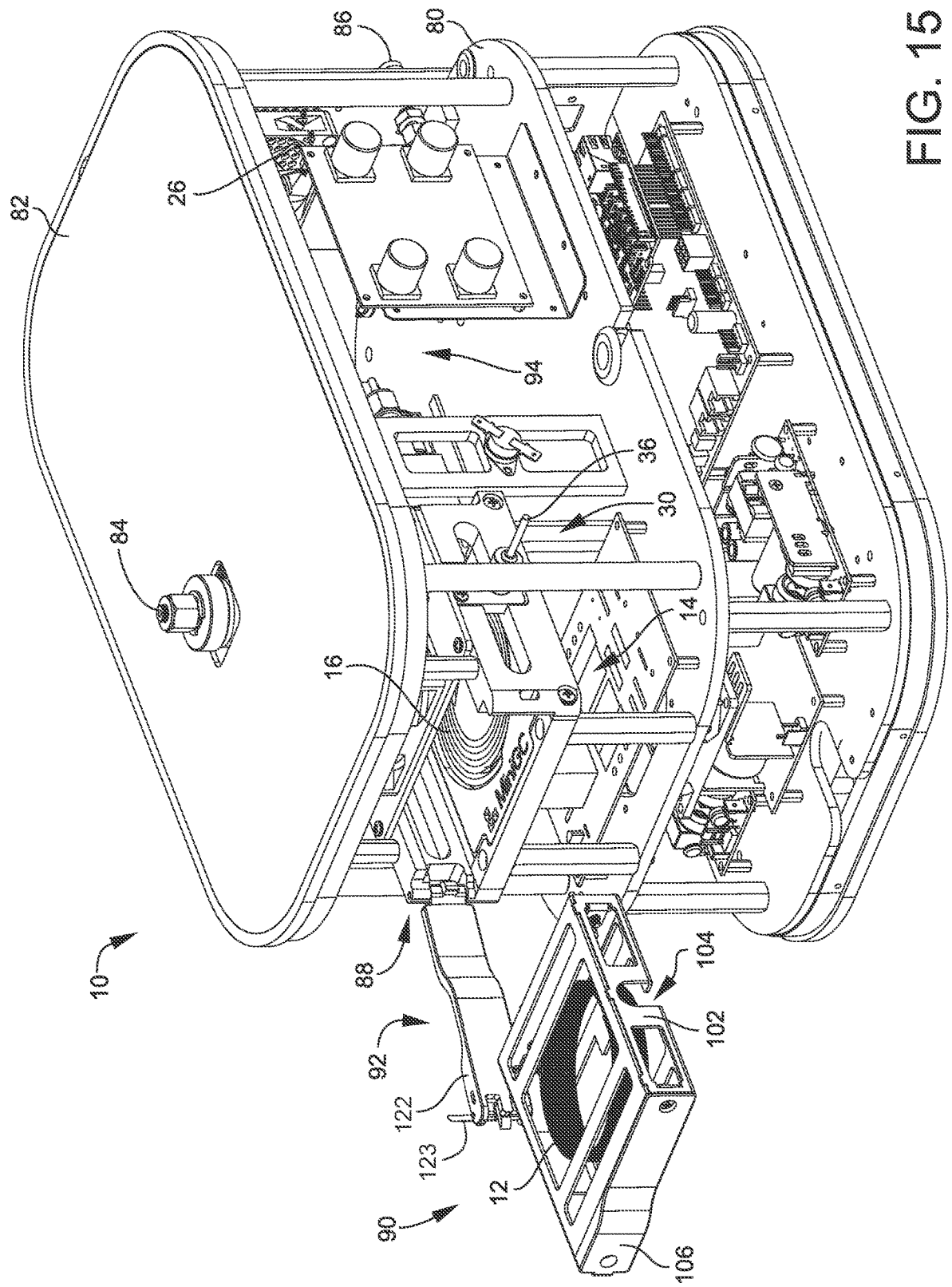
FIG. 15 is a perspective front top view of select embodiments of the gas chromatograph device of FIG. 13 with the cover partially removed except for the top, and with the locking mechanism unlocked and the removable column partially removed.
Figure 16:
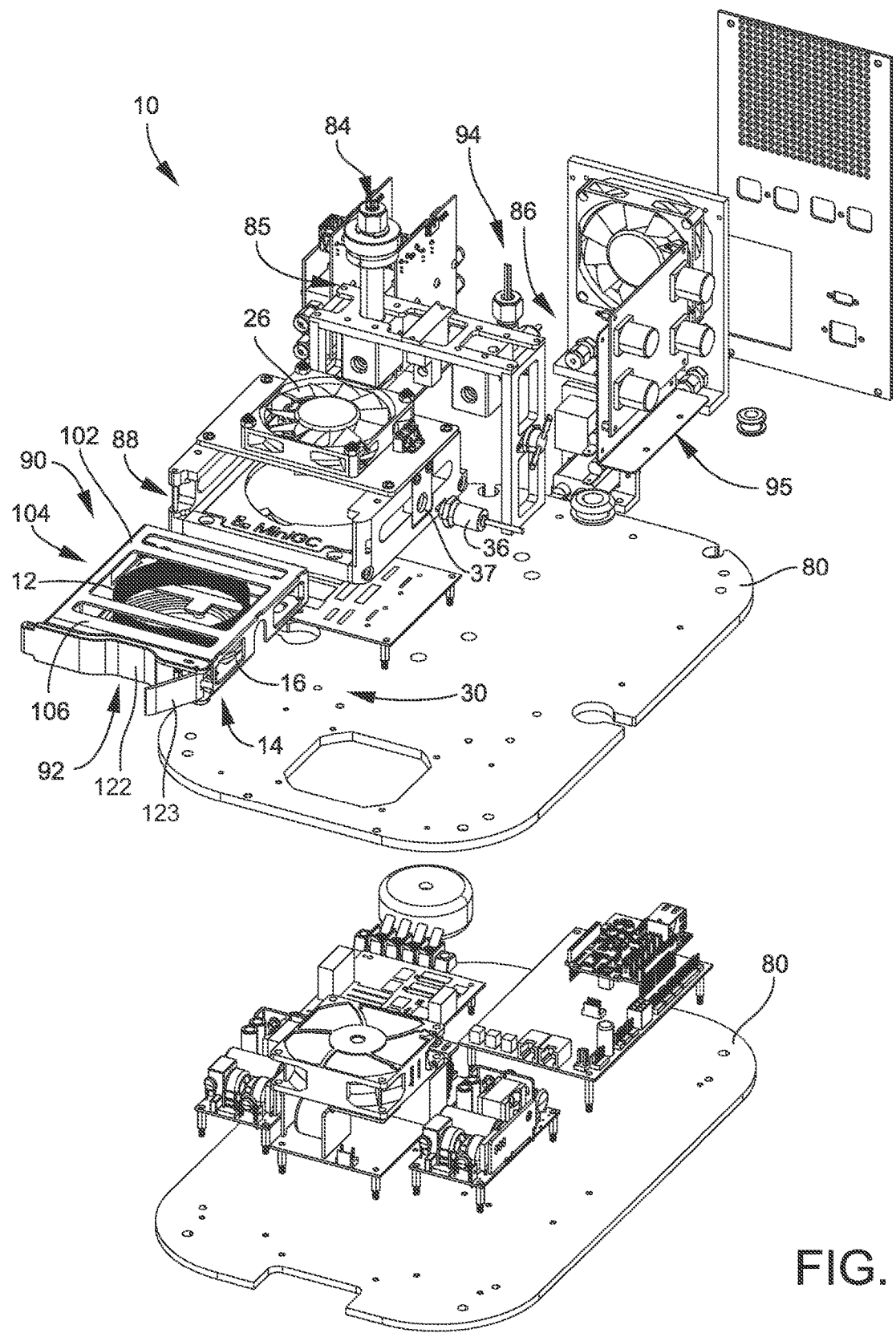
FIG. 16 is a partially disassembled perspective front top view of select embodiments of the gas chromatograph device according to the instant disclosure.
Figure 17:
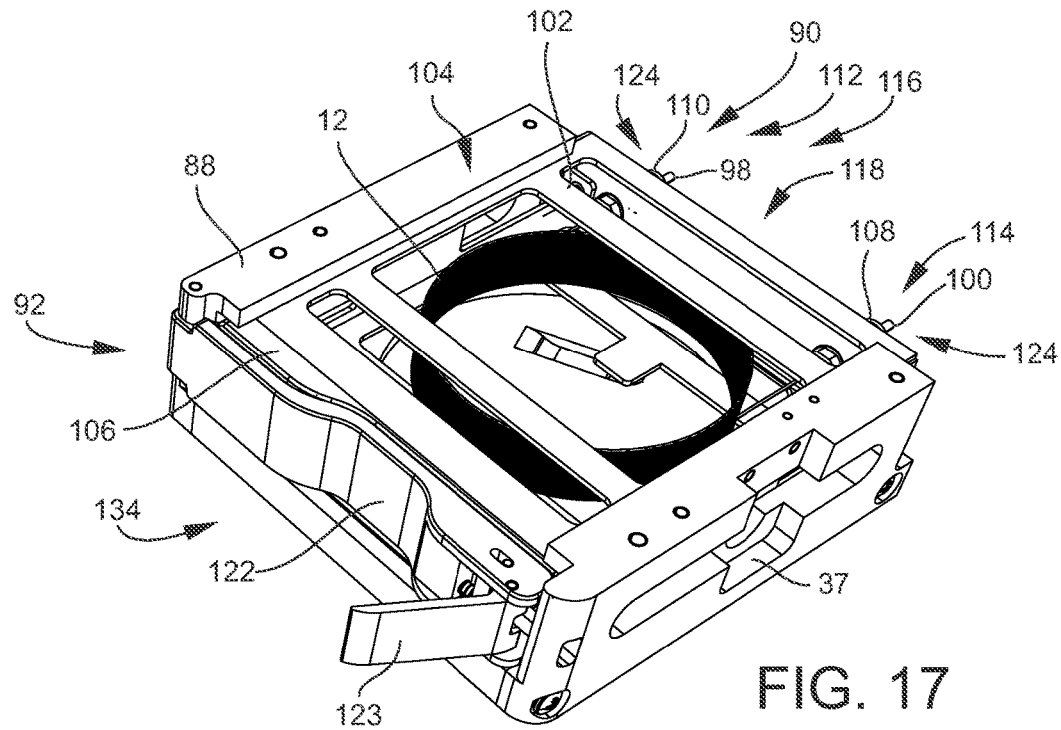
FIG. 17 is a perspective top front view of select embodiments of the removable column holder inserted in the cartridge slot according to select embodiments of the instant disclosure with the locking mechanism locked.
Figure 18:
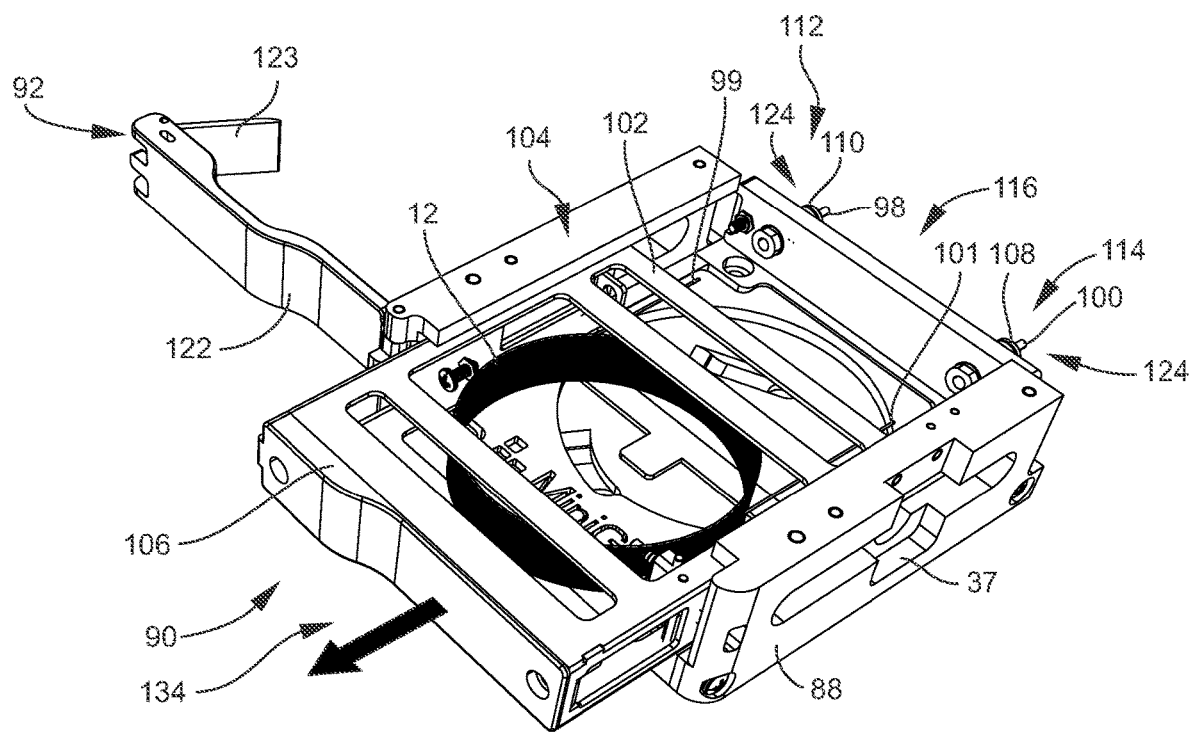
FIG. 18 is a perspective top front view of the removable column holder from FIG. 17 being removed from the cartridge slot according to select embodiments of the instant disclosure with the locking mechanism unlocked.
Figure 19:
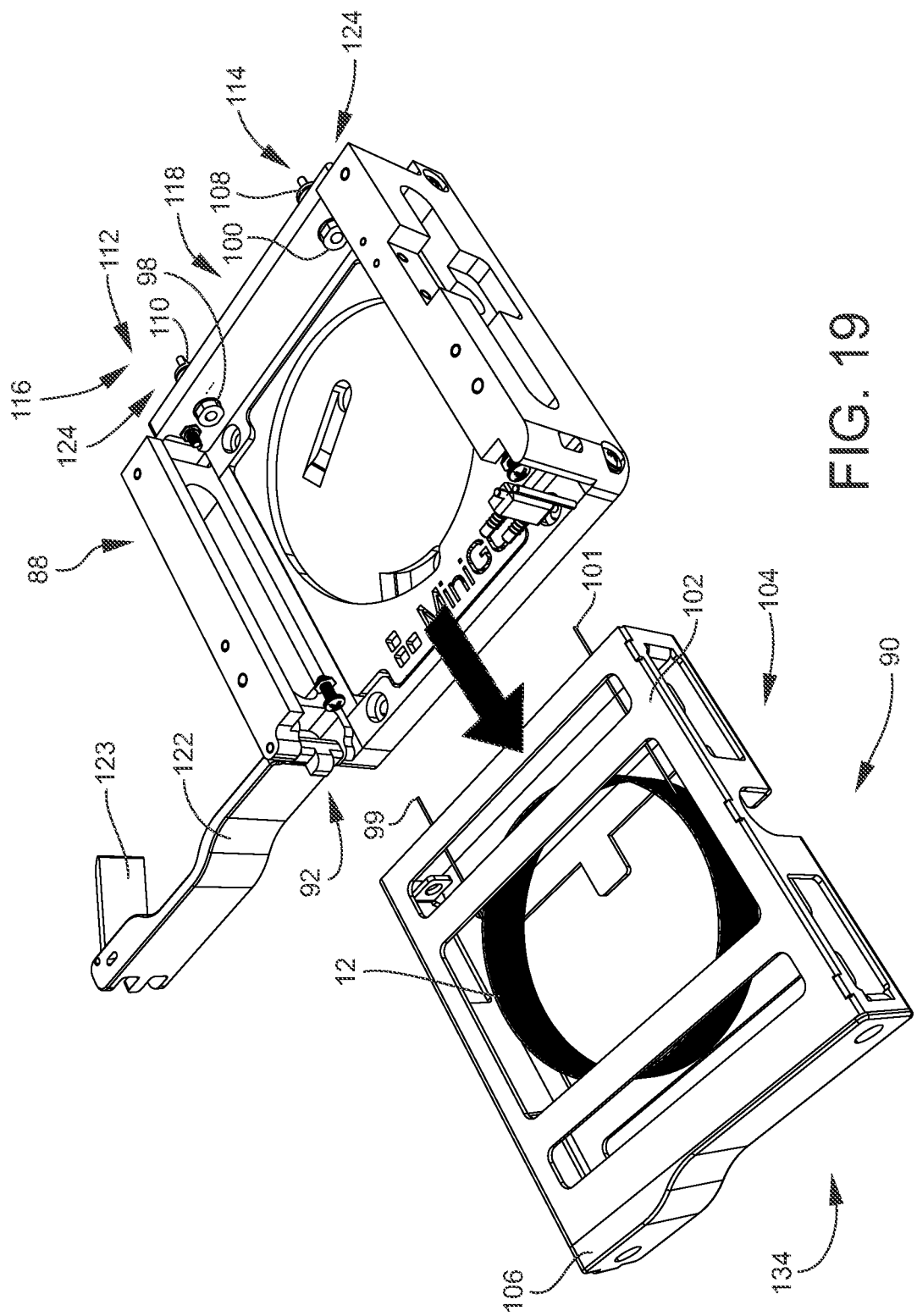
FIG. 19 is a perspective top front view of the removable column holder from FIG. 17 removed from the cartridge slot according to select embodiments of the instant disclosure.
Figure 20:
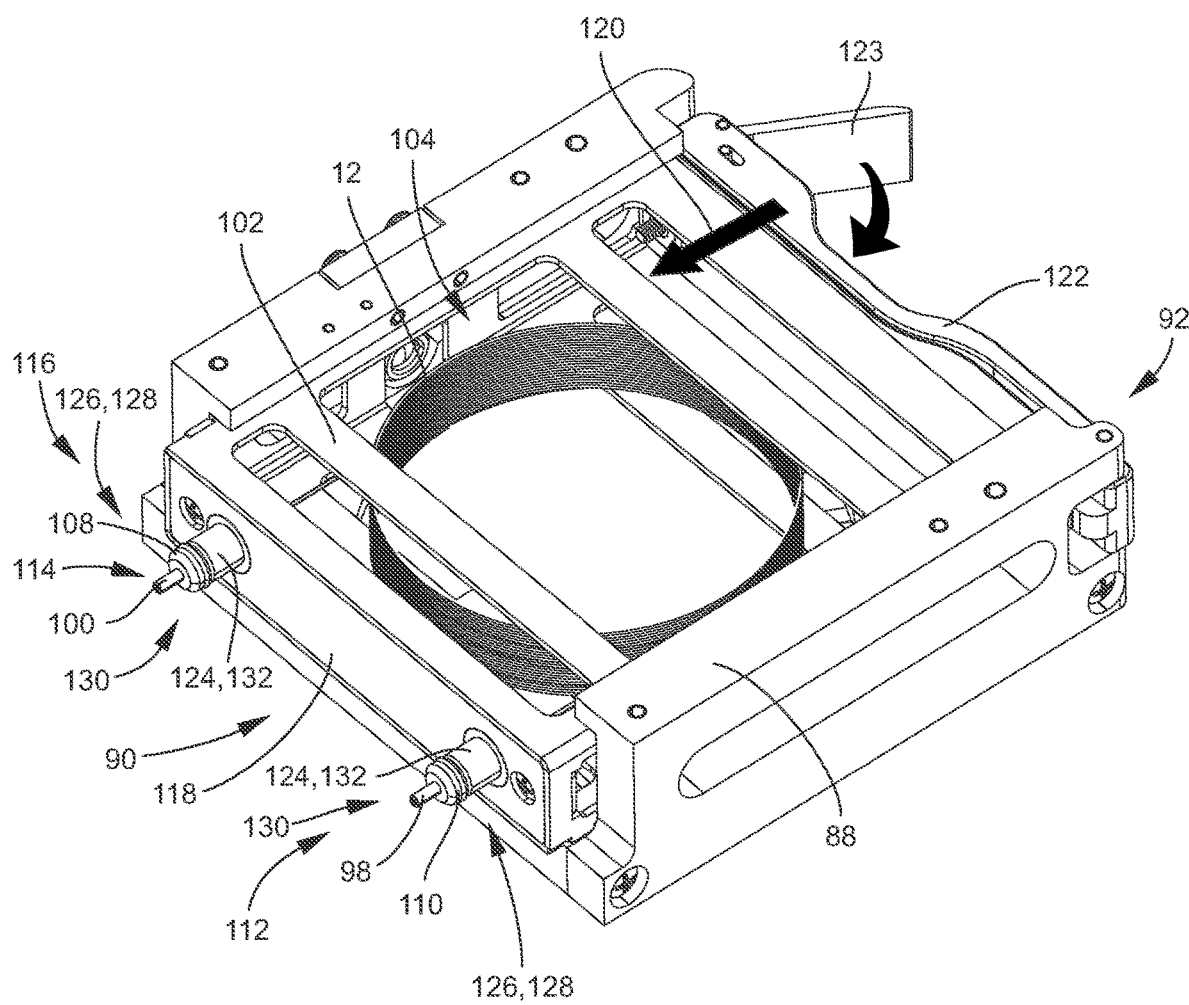
FIG. 20 is a perspective top rear view of the removable column holder from FIG. 17 inside the cartridge slot according to select embodiments of the instant disclosure.
Figure 21:
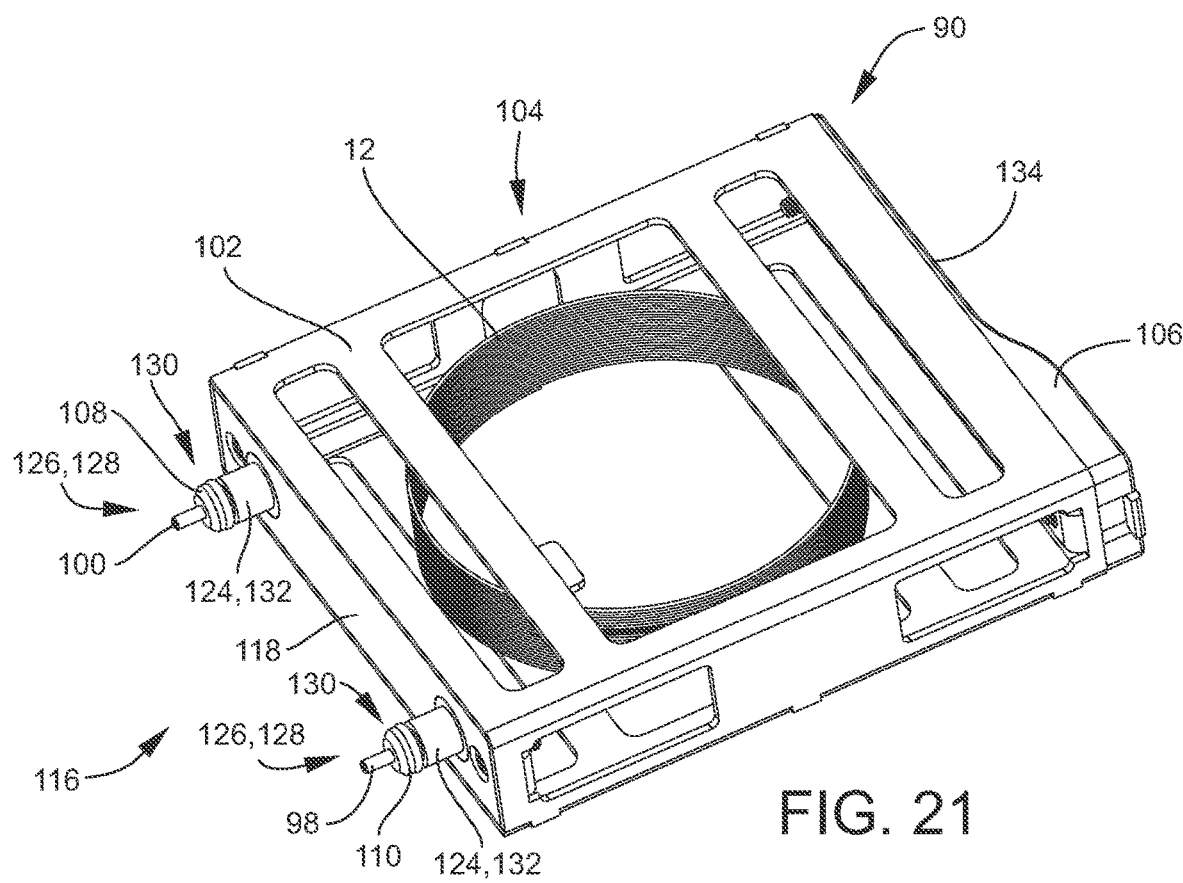
FIG. 21 is a perspective top rear view of the removable column holder according to select embodiments of the instant disclosure.
Figure 22:
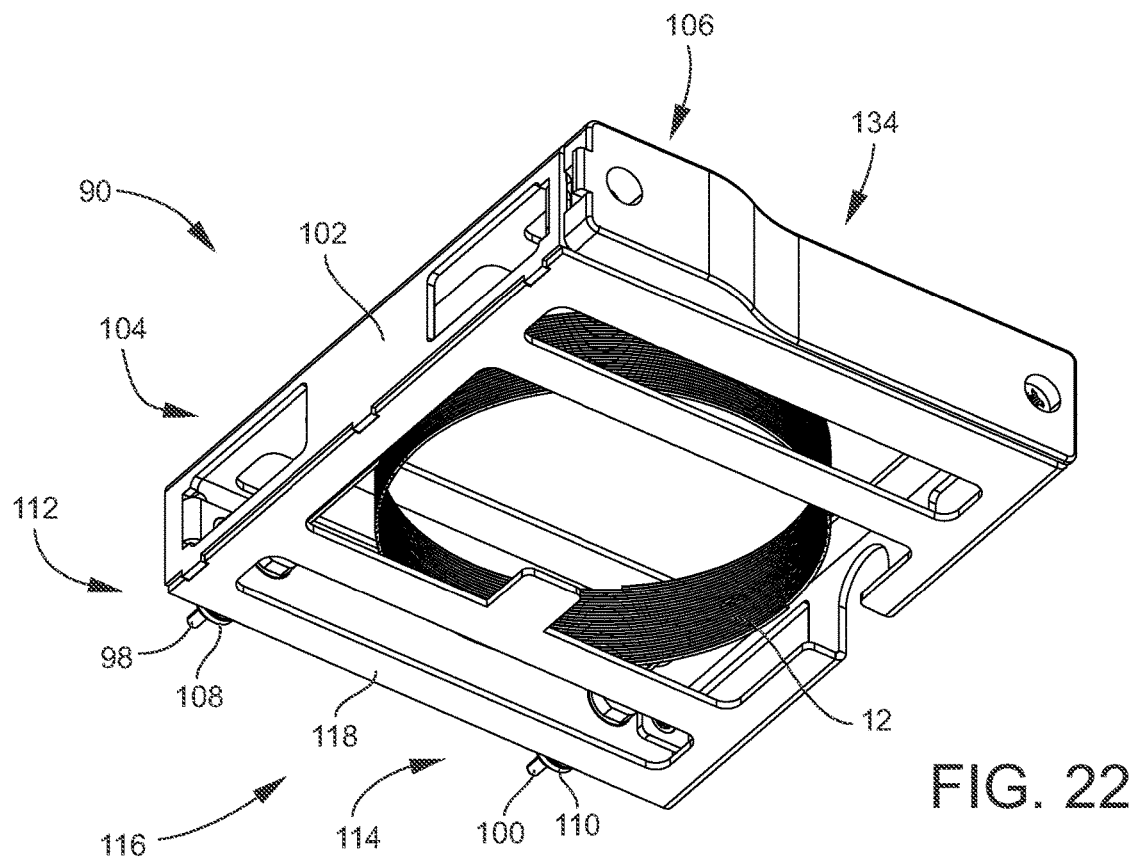
FIG. 22 is a perspective bottom front view of the removable column holder from FIG. 21 according to select embodiments of the instant disclosure.
Figure 23:
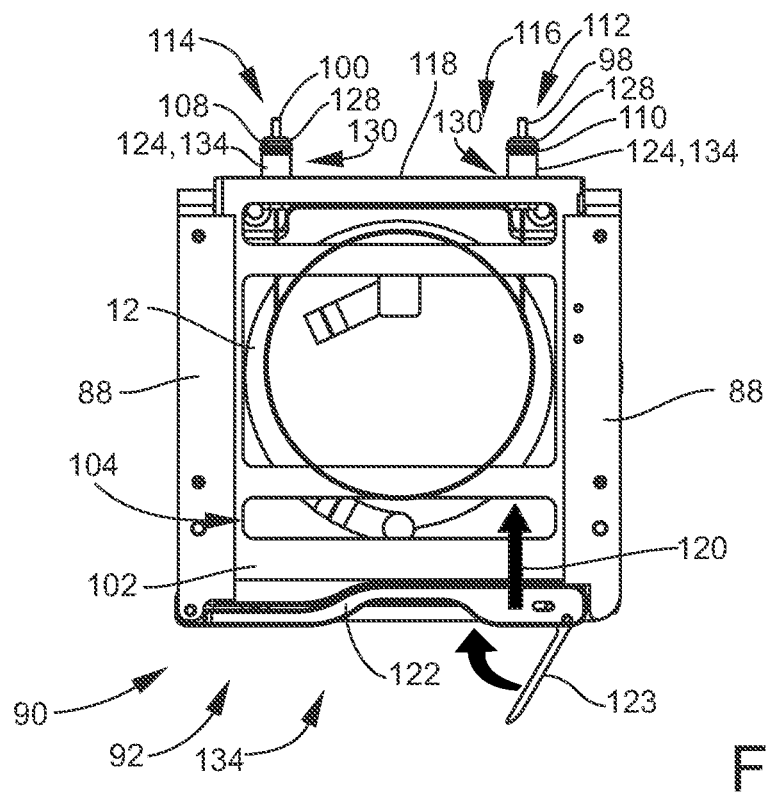
FIG. 23 is a top view of the removable column holder inserted into the cartridge slot according to select embodiments of the instant disclosure.
Figure 24:
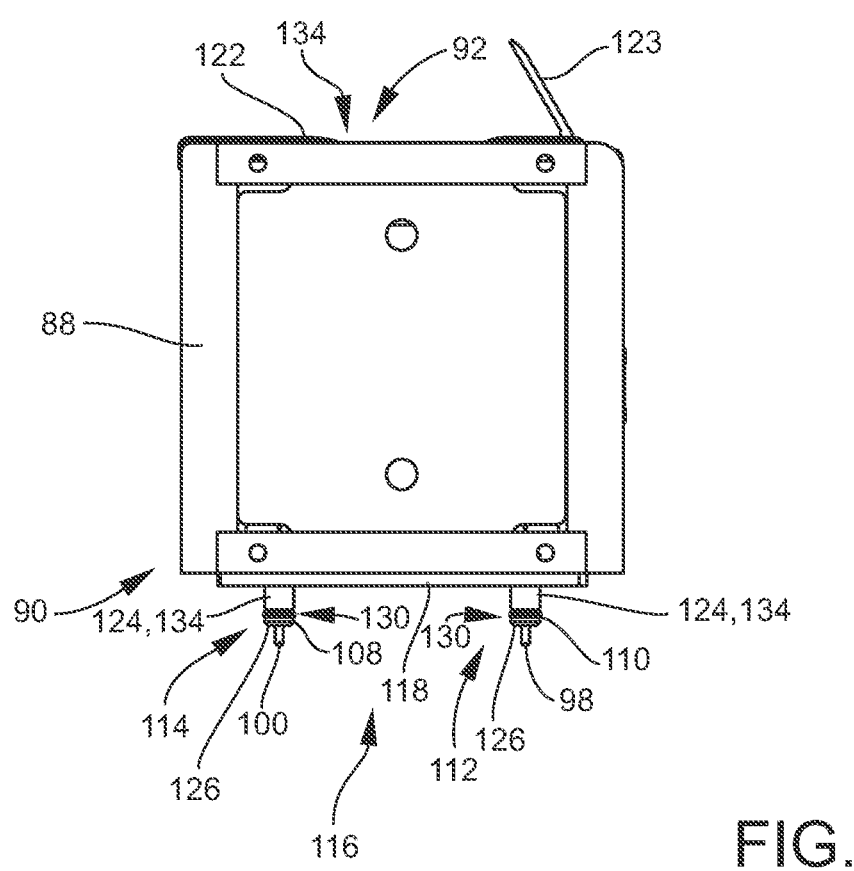
FIG. 24 is a bottom view of the removable column holder from FIG. 23 inserted into the cartridge slot according to select embodiments of the instant disclosure.
Figure 25:
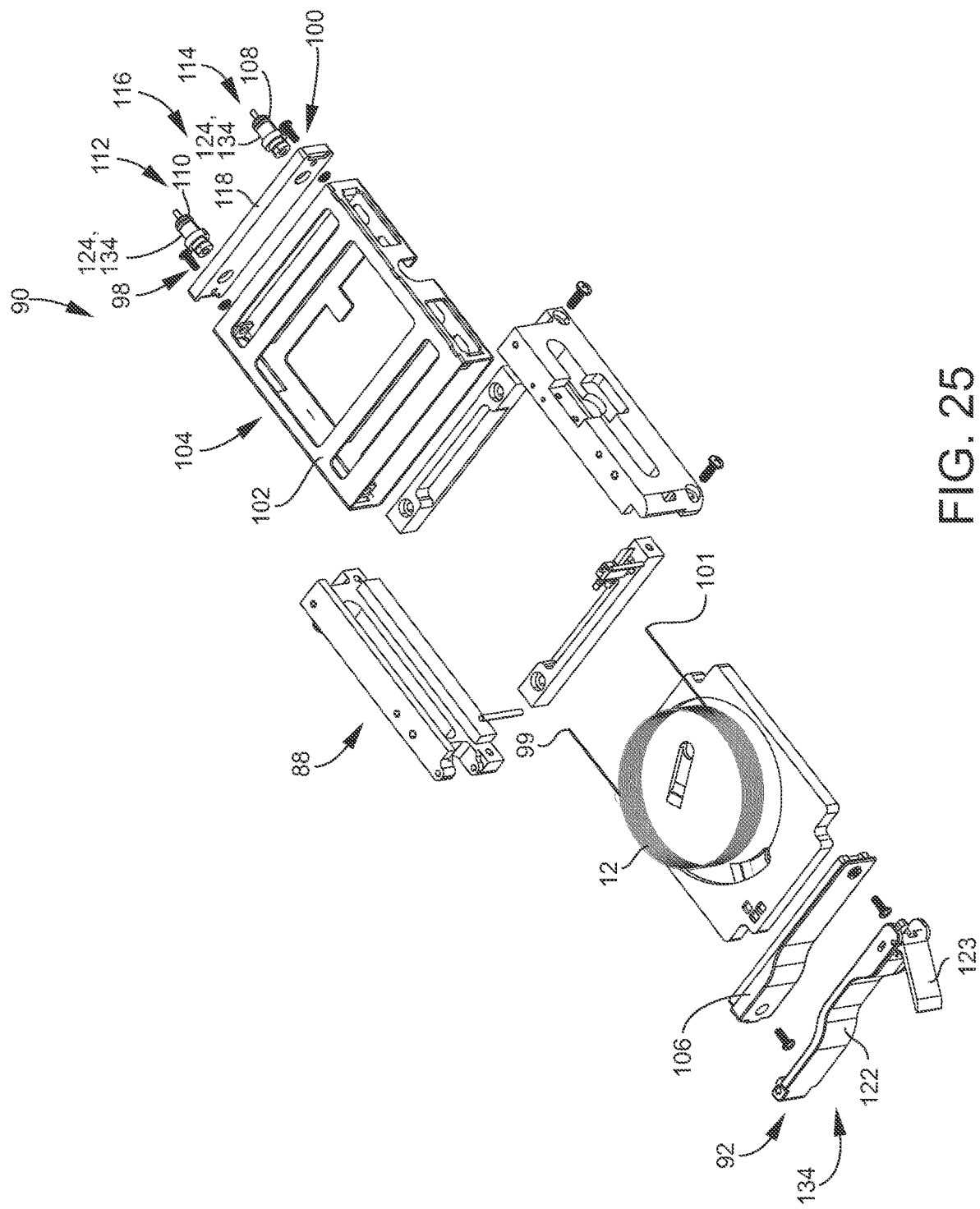
FIG. 25 is perspective top front partially disassembled view of the removable column holder and cartridge slot according to select embodiments of the instant disclosure.

Referring to FIGS. 1-7, the overall size and shape of select embodiments of the instant gas chromatograph device 10 is shown with the cover on. Referring to FIGS. 8-16, the overall size and shape of select embodiments of the instant gas chromatograph device is shown with the cover removed. These Figures show different perspectives of the overall Mini GC 10. FIG. 1 shows the front of the unit where the removable column holder 90 may be inserted into the system. In FIGS. 1 and 2, the removable column holder 90 is in the system and locking mechanism 92 is shown in a locked position in the top diagram and in an unlocked position in the bottom diagram, where the locking mechanism is swung out for accessing the removable column holder 90 inside cartridge slot 88. However, the instant disclosure is not so limited to this embodiment of locking mechanism 92, and other designs for engaging and disengaging the locking mechanism 92 on the removable column holder 90 may be provided. The chimney looking thing shown sticking up from the top of the unit is the top of injector port 84. This may be where the user would inject a sample from a syringe. On the back of the system, which can be seen in FIG. 5, you can see four gas fittings 86. These are the fittings where the needed gases (Helium, Hydrogen, Purified Compressed Air, or other needed gases) are plumbed into the system. The other openings may be for fans 26 and air movement.

Gas chromatograph device 10 may have a length, a width, and a height. Any and/or all of these dimensions may be smaller than the known standard gas chromatographs for making the instant mini GC 10. In select embodiments, the total volume provided by the length, the width, and the height may be less than 20 cubic feet. In other select embodiments, the total volume provided by the length, the width and the height may be less than 10 cubic feet. In other select possibly preferred embodiment, as shown in the Figures, the total volume provided by the length, the width and the height may be approximately or equal to 1.08574 cubic feet. In select embodiments, the length may be less than 4 feet, the width may be less than 4 feet, and/or the height may be less than 4 feet. In other select embodiments, the length may be less than 3 feet, the width may be less than 2 feet, and/or the height may be less than 2 feet. In other select possibly preferred embodiments, as shown in the Figures, the length may be approximately or equal to 16.4 inches, the width may be approximately or equal to 10.4 inches, and the height may be approximately or equal to 11.0 inches. However, the disclosure is not so limited, and any desired shape and/or sizes of gas chromatograph 10 may be provided.

As a result of these smaller or miniaturized dimensions, the instant gas chromatograph 10 may be designed to provide a smaller more portable gas chromatograph that will allow for the unit to take up minimum space and thus be more readily available to multiple users inside and outside of academia and/or industrial labs.

Referring now to FIGS. 8, 9, 11-16, inductive heating source 14 with inductive heating element or coil 16 may be included for inductively heating column 12. In select embodiments, as shown in the Figures, inductive heating element or coil 16 may be configured to induce a current directly into skin 20 of outer layer 22 of column 12. Skin 20 of outer layer 22 of column 12 may be any material configured for inductive heating. In select embodiments, skin 20 of outer layer 22 of column 12 may be metal or silica. In select possibly preferred embodiments, skin 20 of outer layer 22 of column 12 may be metal. Column 12 may be any known or later discovered column configured for gas chromatography. In select embodiments, column 12 may be a metal or silica column configured for gas chromatography. Column 12 may be provided in any desires shape or form configured for gas chromatography. In select embodiments, as shown in the Figures, column 12 may be provided in a coiled form. In select embodiments, the inductive heating element or coil 16 may be configured to directly heat column 12 controllably up to needed temperature 24. Needed temperature 24 may be any needed or required temperature for gas chromatography in column 12. In select embodiments, the inductive heating element or coil 16 may be configured to directly heat column 12 controllably up to needed temperature 24 and hold column 12 at needed temperature 24, like for specific durations for gas chromatography within column 12. This may be controlled by various sensors and processors, as shown in the Figures.

Referring now to FIGS. 5 and 8-16, at least one fan 26 may be included in gas chromatograph device 10. Wherein, the inductive heating element or coil 16 may be configured to allow gas chromatograph device 10 to cool column 12 by turning off inductive heating element or coil 16 and blowing or fanning cool air 28 over the column via the fans 26. This may be controlled by various sensors and processors, as shown in the Figures. In select embodiments, as shown in the Figures, two fans 26 may be included in gas chromatograph device 10. In select embodiments, as shown in the Figures, one fan 26 may be included at the rear of the unit and positioned behind a grate or screen for forcing cool air 28 into or out of cover 82 from the rear. Another fan 26 may be included above cartridge slot 88 for forcing air over column 12 when removable column holder 90 is positioned inside cartridge slot 88. Frame 80 of gas chromatograph device 10 may be included, as shown in the Figures, with minimal design and various slots, holes, notches, etc. for allowing air flow through gas chromatograph device 10.

Temperature sensor 30 may be included in select embodiments of gas chromatograph device 10. See FIGS. 8-16. Temperature sensor 30 may be for measuring the temperature of column 12, including, but not limited to, measuring temperature 32 of surface 34 of inductively heated column 12. Temperature sensor 30 may be configured for noncontact, direct temperature measurement of column 12. As such, temperature sensor 30 may be positioned inside gas chromatograph device 10 in any position with a line of sight of column 12 when removable column holder 90 is positioned in cartridge slot 88. As shown in FIGS. 8, 10, 11, 13, 15 and 16, temperature sensor 30 may be mounted in temperature sensor mount 37 on the side of cartridge slot 88. Temperature sensor mount 37 may include a hole configured for receiving temperature sensor 30. This position of temperature sensor mount 37 may provide a clear line of sight of column 12 when positioned in removable column holder 90 in cartridge slot 88 via holes, vents, slots 104 of housing 102 of removable column holder 90. Wherein, temperature sensor 30 may be configured to read surface temperature 32 of surface 34 of column 12 without touching column 12. In select embodiments, inductive heating source 14 may be configured to be controlled by temperature sensor 30. In these embodiments, inductive heating of column 12 may be controlled by the noncontact, direct temperature measurement of column 12. Temperature sensor 30 may be any temperature sensor configured for reading the temperature of column 12. In select embodiments, temperature sensor 30 may be infrared temperature sensor 36, as shown in FIGS. 8, 10, 11, 13, 15 and 16. Infrared temperature sensor 36 may be any infrared sensor or like sensor, configured for noncontact, direct temperature measurement of column 12

Referring to FIGS. 8-16, frame 80 may be included in gas chromatograph device 10. Frame 80 may be for supporting the components and structures of gas chromatograph device 10. As shown in the Figures, frame 80 may be configured for minimum size and structure of gas chromatograph device 10. Frame 80 may include various passageways and air ways for circulating cool air 28 via fans 26 and in and out of vent holes 96 in cover 82. In select embodiments, frame 80 may include two layers, where the top layer may be configured for gas chromatography, and the bottom layer may be configured for the processors for controlling gas chromatography of mini GC 10.

Referring now to FIGS. 1-7, cover 82 may be included with the instant gas chromatograph device 10. Cover 82 may be for protecting the inside components and parts from the outside environment. Cover 82 may include side components as well as a top component. Cover 82 may include vent holes 96 in various positions around cover 82 configured for allowing cool air 28 to flow in and out of gas chromatograph device 10. Cover 82 may include a slot sized to receive removable column holder 90 into cartridge slot 88.

Referring now to FIGS. 1-16, injector port 84 may be included with the instant gas chromatograph device 10. Injector port 84 may be for inserting or injecting the fluid to be analyzed or conducted gas chromatography on, inside gas chromatograph device 10. As shown in the Figures, injector port 84 may be positioned through the top of cover 82 for inserting or injecting the gas inside gas chromatograph device 10. Injector port 84 may be any known or standard injector port for GCs. In select embodiments, injector port 84 may include injection manifold 85. See FIGS. 11-14 and 16. Injection manifold 85 may be for controlling the fluid injected through injector port 84 with fluid introduced into column 12. As such, injection manifold 85 may be in fluid communication with column 12 via injector port pin 98. See FIGS. 13, 14 and 17.

Referring to FIGS. 3-5, 10, and 12-16, gas fittings 86 may be included with the instant gas chromatograph device 10. Gas fittings 86 may be for introducing additional fluids or carrier gases into the gas chromatography process inside mini GC 10. Gas fittings 86, may be positioned on the back of gas chromatograph device 10, as shown in the Figures. In gas chromatography inside mini GC 10, the mobile phase (or "moving phase") may be a carrier gas, usually an inert gas such as helium or an unreactive gas such as nitrogen. Helium remains the most commonly used carrier gas in most common instruments, however hydrogen may be preferred for improved separations. Gas fittings 86 may be the fittings where the needed gases (Helium, Hydrogen, Purified Compressed Air, or other needed gases) are plumbed into the system of gas chromatograph device 10.

Referring now to FIGS. 1-2, 6-9, and 11-25, removable column holder 90 may be included with the instant gas chromatograph device 10. Removable column holder 90 may be for holding column 12. Removable column holder 90 may allow for easy and quick removal and insertion of column 12 to and from cartridge slot 88 of gas chromatograph device 10. Removable column holder 90 may include housing 102 configured to secure column 12 inside removable column holder 90. Housing 102 may include plurality of holes, vents, slots 104, etc. for providing air flow through column 12. Housing 102 may include tab 106 on the outer side of removable column holder 90. Tab 106 may be for manipulating or gripping removable column holder 90, like for inserting and removing removable column holder 90 to and from cartridge slot 88 of gas chromatograph device 10. Removable column holder 90 may include detector o-ring 108 for sealing detector pin 100 to detector 94 (or lines thereto) when removable column holder 90 is inserted into cartridge slot 88 of gas chromatograph device 10. Likewise, removable column holder 90 may include injector o-ring 110 for sealing injector port pin 98 with injector port 84 (or lines thereto) when removable column holder 90 is inserted into cartridge slot 88 of gas chromatograph device 10. Locking mechanism 92 may be included with gas chromatograph device 10. Locking mechanism 92 may be for securing removable column holder 90 inside cartridge slot 88 of gas chromatograph device 10. Locking mechanism 92 may be any device or mechanisms configured for securing removable column holder 90 inside cartridge slot 88 of gas chromatograph device 10. As shown in the Figures, locking mechanism 92 may be a latch system configured to hinge from one side of cartridge slot 88 to the other side for securing removable column holder 90 inside cartridge slot 88.

The instant disclosure is designed to provide a system that is a GC that utilizes removable GC column holder 90 that is small, lightweight, low cost, with an easily removable column, and able to handle a wide variety of GC columns 12. This removable column holder 90 may be unique in that the column holder only holds the column, making it the smallest, lightest, and lowest cost possible. Also, the removable column holder 90 may be very easy to interchange columns 12 into the cartridge and may allow the user to affordably interchange many columns 12. The removable column holder 90 may also protect the fragile column 12 from mechanical damage and contamination due to handling that is common for columns not in holders.

Referring to FIGS. 1-2, 6-9, 11-20 and 23-25, cartridge slot 88 may be included with the instant gas chromatograph device 10. Cartridge slot 88 may be for receiving and removing removable column holder 90 in and out of gas chromatograph device 10. As such, cartridge slot 88 may be configured to receive removable column holder 90 with column 12. Cartridge slot 88 may be designed and sized to receive removable column holder 90. Wherein, the inductive heating source 14 may be positioned above, below, or around cartridge slot 88. In select possibly preferred embodiments, the inductive heating source 14 may be positioned below cartridge slot 88, as shown in the Figures.

Detector 94 may be included in gas chromatograph device 10. See FIGS. 8, 9, and 12-16. Detector 94 may be used for detection during or after the gas chromatography process. As the compounds separate based on their rate of progress through column 12 they will exit column 12 through detector pin 100 and go into detector 94 where detector 94 may report the intensity of each compound which correlates to the amount of that compound. Detector 94 may include detector board 95.

Figure 26:
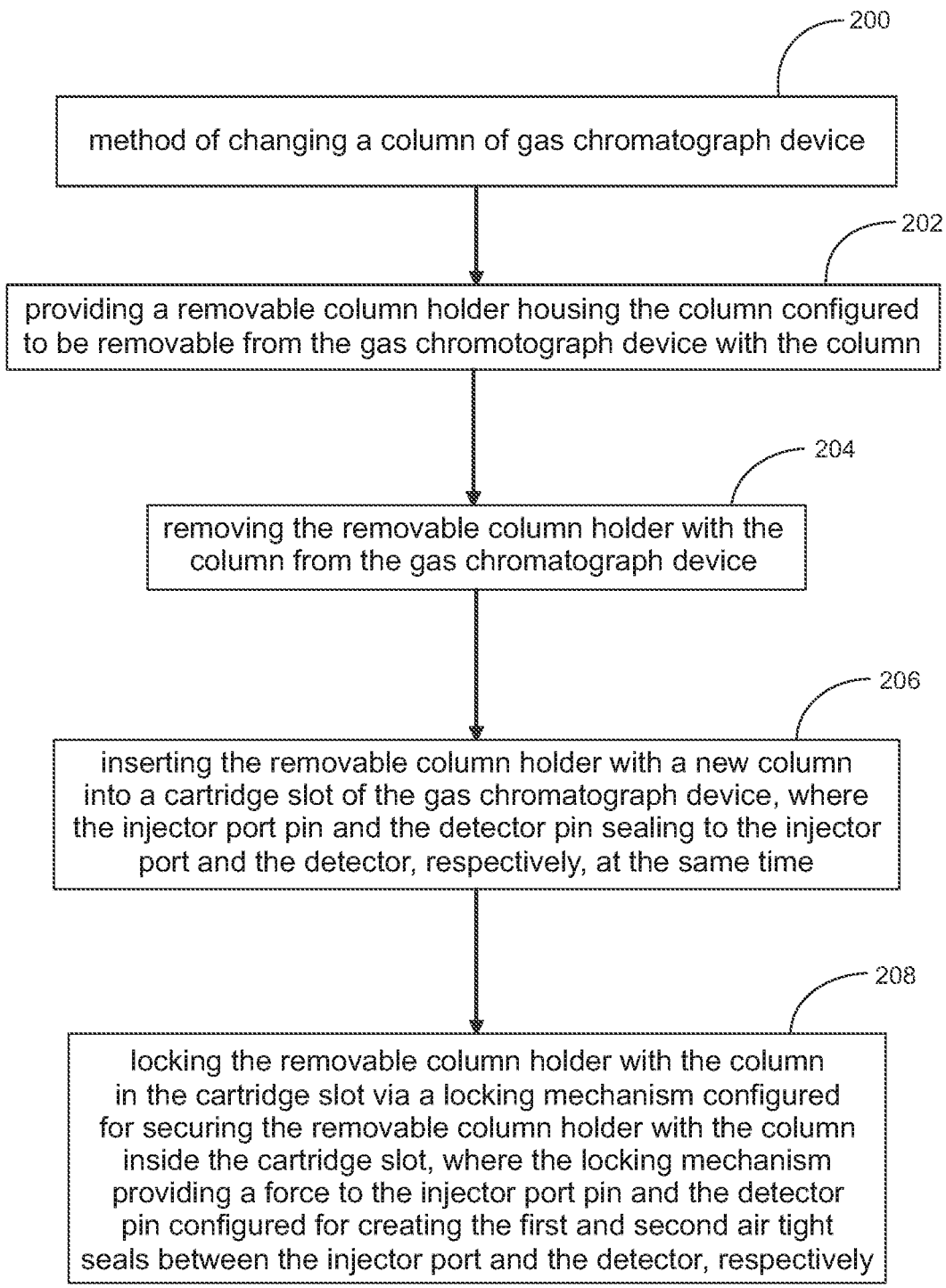
FIG. 26 is a flow diagram of select embodiments of the method of changing the column of a gas chromatograph column according to select embodiments of the instant disclosure.

Referring now to FIG. 26, in another aspect, the instant disclosure embraces method 200 of changing column 12 of gas chromatograph device 10. Method 200 of changing column 12 of gas chromatograph device 10 may generally include step 202 of providing removable column holder 90 in any of the various embodiments shown and/or described herein. As such, removable column holder 90 provided in method 200 may house column 12 and may be configured to be removable from gas chromatograph device 10 with column 12. As a result, method 200 of changing column 12 of gas chromatograph device 10 may further include step 204 of removing removable column holder 90 with column 12 from gas chromatograph device 10. In select embodiments of method 200 of changing column 12 of gas chromatograph device 10, wherein: column 12 including injector port pin 98 connected to first tip 99 of column 12 at one end, injector port pin 98 is configured to provide first air tight seal 112 to injector port 84 of gas chromatograph device 10, and detector pin 100 is connected to second tip 101 of column 12 at its other end, detector pin 100 is configured to provide second air tight seal 114 to detector 94 of gas chromatograph device 10; the removable column holder 90 including sealing system 116 that allows gas flow from injector port 84 into column 12 via injector port pin 98, and from column 12 into detector 94 via detector pin 100 configured to allow the detection of compounds that may only be present in low levels; and removable column holder 90 including housing 102 configured to contain column 12 in removable column holder 90, where housing 102 containing column 12 inside with injector port pin 98 and detector pin 100 protruding therefrom, wherein injector port pin 98 and detector pin 100 protruding from same side 118 of housing 102; method 200 may further include: step 206 of inserting removable column holder 90 with new column 12 into cartridge slot 88 of gas chromatograph device 10, where injector port pin 98 and detector pin 200 sealing to injector port 84 and detector 94, respectively, at the same time; and step 208 of locking removable column holder 90 with column 12 in cartridge slot 88 via locking mechanism 92 configured for securing removable column holder 90 with column 12 inside cartridge slot 88, where locking mechanism 92 providing force 120 to injector port pin 98 and detector pin 100 configured for creating first and the second air tight seals 112 and 114 between injector port 84 and detector 94, respectively.

In sum, the instant disclosure may be directed to gas chromatograph device 10 with removable column holder 90. See FIGS. 1-25 The instant disclosure is designed to provide a system that is a GC that utilizes a removable GC column holder that is small, lightweight, low cost, with an easily removable column, and able to handle a wide variety of GC columns. This removable column holder 90 may be unique in that the column holder only holds the column, making it the smallest, lightest, and lowest cost possible. Also, the removable column holder 90 may be very easy to interchange columns 12 into the cartridge slot 88, and may allow the user to affordably interchange many columns 12. The removable column holder 90 may also protect the fragile column 12 from mechanical damage and contamination due to handling that is common for columns not in holders.

Currently, most GC columns are attached to the injector port and the detector via compression fittings that require a wrench to engage and disengage. The user must open the front of the oven and then reach inside with a wrench to disengage and engage the column. Care must be taken during this process not to burn yourself and not to touch the tips of the column with your bare fingers which would introduce contamination into the system. Care must also be taken not to break the delicate column but also to engage the fittings firmly enough with a wrench to ensure air tight seals. Frequently the entire system must be leak checked after installing a column to ensure leak free installation. Also, specific user knowledge is required to understand exactly how far to install the column into the injector port and the detector otherwise results can be inconsistent and poor.

On the other hand, with the instant disclosure, removable column holder 90 may allow the users to introduce columns 12 into the system much like you would plug video games into a video game console eliminating the need for tools and eliminating the possibility of user error. The column 12 may be contained in the cartridge style removable column holder 90 and custom pins 98 and 100 that keep the user from touching and thereby contaminating the column tips 99 and 101. The cartridge style removable column holder 90 may also ensure that the column 12 is sealed air tight to the injector port 84 and detector 94 via sealing system 116.

Removable column holder 90, as described herein, may refer to any housing, cartridge, holder, the like, etc., that may contain column 12 for gas chromatograph device 10, that is removable from gas chromatograph device 10. Removable column holder 90 may be small, lightweight, and low cost, and may have column 12 that is removable therefrom, and/or may be able to handle a wide variety of GC columns. In select embodiments, removable column holder 90 may only hold column 12, i.e. it does not contain injector port 84, heating elements, detector 94, or any other parts or components of the GC.

As can be seen, removable column holder 90 is very small, low cost, and simple, with column 12 easily replaceable. Removable column holder 90 may include a few aluminum brackets that form a cage or housing 102 around column 12 to hold column 12 and protect it from mechanical damage, but removable column holder 90 does not form a temperature isolation zone or oven. Pins 98 and 100 which can be seen protruding on the same side 118 of the unit are the two engagement points that insert into the mini GC system. Injector pin 98 engages into the bottom of the injector port 84 and detector pin 100 engages into detector 94. So, the sample injected as either a liquid or gas is vaporized by the high temperature at which the injector port 84 is held (maybe 300 C), and then the carrier gas, helium in most cases, sweeps some or all of this vaporized sample into column 12 through injector port pin 98. At the beginning of a test, column 12 is typically may be held at a lower temperature (maybe 60 C), so some of the compounds in the sample will condense on column 12. During the course of the test, the column temperature is increased at a controlled rate so that different compounds with different boiling points and affinities for the inner surface of column 12 (which varies with the column that is inserted in the system) progress through column 12 at different rates being pulled along by the constant flow of the carrier gas. As these compounds separate based on their rate of progress through column 12 they will exit column 12 through detector pin 100 and go into detector 94 where detector 94 reports the intensity of each compound which correlates to the amount of that compound. The compounds can then be identified based on their retention time or the time it takes them to progress through the system.

Pins 98 and 100 are a critical part of the instant disclosure of gas chromatograph device 10 with removable column holder 90. Pins 98 and 100 allow very low leak sealing between injector port 84 and column 12 and between column 12 and detector 94. If these seals don't seal to a very low level of leakage air, other contaminates can be introduced into the system and the results will suffer. These seals 112 and 114 of sealing system 116 must also be made between two components that are changing in temperature constantly and reaching extremely high temperatures (up to 400 C). They must also remain their integrity after removable column holder 90 has been inserted into and removed from the system many times, which creates mechanical stress on seals.

Currently, because columns must be moved into and out of GCs for different applications and they become degraded over time, it is a step that traditionally requires a highly trained user and requires some time to accomplish making this frequent step painful. By providing removable column holder 90 that easily engages column 12 reliably into gas chromatograph device 10, different columns may be interchanged frequently and by anyone without any training required and any risk of damaging the system or creating poor results based on incorrect installation.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A gas chromatograph device comprising:
   a column configured for gas chromatography;
   a frame;
   a cover;
   an injector port;
   gas fittings in fluid communication with the injector port;
   a detector;
   a removable column holder housing the column configured to be removable from the gas chromatograph device with the column; and
   at least one vent hole in the cover configured for providing air flow through the column via at least one fan.

2. The gas chromatograph device of claim 1, wherein the removable column holder housing only the column.

3. The gas chromatograph device of claim 1, wherein the removable column holder is configured to allow removing and interchanging of the column within the removable column holder.

4. The gas chromatograph device of claim 1, wherein the removable column holder is configured to protect the column within the removable column holder from mechanical damage and contamination due to handling.

5. The gas chromatograph device of claim 1, wherein the removable column holder is configured to allow a user to install or remove the column into or out of the gas chromatograph without the need for tools.

6. The gas chromatograph device of claim 1, wherein the removable column holder is configured to reduce possibility of error when installing the column.

7. The gas chromatograph device of claim 1, wherein:
   said column in the removable column holder including:
      an injector port pin connected to a first tip of the column at one end, the injector port pin is configured to provide a first air tight seal to an injector port of the gas chromatograph device; and
      a detector pin connected to a second tip of the column at its other end, the detector pin is configured to provide a second air tight seal to a detector of the gas chromatograph device;
      wherein the removable column holder including a sealing system that allows gas flow from the injector port into the column via the injector port pin, and from the column into the detector via the detector pin configured to allow detection of compounds that may only be present in low levels.

8. The gas chromatograph device of claim 7, wherein:
   said removable column holder including:
      a housing configured to contain the column in the removable column holder, where the housing containing the column inside with the injector port pin and the detector pin protruding therefrom;
      wherein, the housing is configured to keep a user from contaminating the first tip or the second tip of the column.

9. The gas chromatograph device of claim 8, wherein the injector port pin and the detector pin protruding from a same side of the housing, whereby, when the removable column holder is inserted into the gas chromatograph device, the injector port pin and the detector pin sealing to the injector port and the detector, respectively, at the same time.

10. The gas chromatograph device of claim 8, wherein the housing further comprising:
    a plurality of holes, vents, slots, or combinations thereof configured for air flow through the column; and
    a tab configured for gripping the removable column holder to insert or remove the removable column holder from the cartridge slot, said tab protruding from an opposite side of the housing as the injector port pin and the detector pin.

11. The gas chromatograph device of claim 9 further comprising:
    a cartridge slot configured to receive the removable column holder with the column.

12. The gas chromatograph device of claim 11 further comprising:
    a locking mechanism configured for securing the removable column holder with the column inside the cartridge slot, where the locking mechanism providing a force to the injector port pin and the detector pin configured for creating the first and second air tight seals between the injector port and the detector, respectively;
    wherein the locking mechanism including a mechanical latch with a lever configured to engage the cartridge slot for securing the removable column holder into the cartridge slot with the force to engage the sealing system.

13. The gas chromatograph device of claim 12, wherein the sealing system including springs on each of the injector port pin and the detector pin to engage the injector port and the detector independently to overcome tolerance issues between different holders and columns, wherein the springs being a flexible washer or gasket on the injector port pin and the detector pin configured for sealing to the injector port and detector, respectively.

14. The gas chromatograph device of claim 11 further comprising:
    a detector O-ring configured for sealing the detector pin of the column to the detector when the removable column holder is inserted and locked in the cartridge slot; and
    an injector O-ring configured for sealing the injector port pin of the column to the injector port when the removable column holder is inserted and locked in the cartridge slot.

15. The gas chromatograph device of claim 13, wherein:
    the injector port pin and the detector pin including tapered features configured for sealing to the injector port and detector, respectively.

16. The gas chromatograph device of claim 14, wherein the detector O-ring and the injector O-ring are configured to seal to the injector port and the detector, respectively, in a face sealing arrangement or a plug sealing arrangement.

17. A method of changing a column of a gas chromatograph device comprising:
    providing a removable column holder housing the column configured to be removable from the gas chromatograph device with the column; and removing the removable column holder with the column from the gas chromatograph device;
wherein:
the column including an injector port pin connected to a first tip of the column at one end, the injector port pin is configured to provide a first air tight seal to an injector port of the gas chromatograph device, and a detector pin connected to a second tip of the column at its other end, the detector pin is configured to provide a second air tight seal to a detector of the gas chromatograph device;
the removable column holder including a sealing system that allows gas flow from the injector port into the column via the injector port pin, and from the column into the detector via the detector pin configured to allow the detection of compounds that may only be present in low levels; and
the removable column holder including a housing configured to contain the column in the removable column holder, where the housing containing the column inside with the injector port pin and the detector pin protruding therefrom, wherein the injector port pin and the detector pin protruding from the same side of the housing;
whereby, the method further including:
    inserting the removable column holder with a new column into a cartridge slot of the gas chromatograph device, where the injector port pin and the detector pin sealing to the injector port and the detector, respectively, at the same time; and
    locking the removable column holder with the column in the cartridge slot via a locking mechanism configured for securing the removable column holder with the column inside the cartridge slot, where the locking mechanism providing a force to the injector port pin and the detector pin configured for creating the first and the second air tight seals between the injector port and the detector, respectively.

18. A gas chromatograph device comprising:
a column configured for gas chromatography; and
a removable column holder housing the column configured to be removable from the gas chromatograph device with the column;
wherein, said column in the removable column holder including:
    an injector port pin connected to a first tip of the column at one end, the injector port pin is configured to provide a first air tight seal to an injector port of the gas chromatograph device;
    a detector pin connected to a second tip of the column at its other end, the detector pin is configured to provide a second air tight seal to a detector of the gas chromatograph device;
    wherein the removable column holder including a sealing system that allows gas flow from the injector port into the column via the injector port pin, and from the column into the detector via the detector pin configured to allow detection of compounds that may only be present in low levels;
wherein, said removable column holder including:
    a housing configured to contain the column in the removable column holder, where the housing containing the column inside with the injector port pin and the detector pin protruding therefrom;
    wherein, the housing is configured to keep a user from contaminating the first tip or the second tip of the column;
    wherein the injector port pin and the detector pin protruding from a same side of the housing, whereby, when the removable column holder is inserted into the gas chromatograph device, the injector port pin and the detector pin sealing to the injector port and the detector, respectively, at the same time;
    a cartridge slot configured to receive the removable column holder with the column; and
    a locking mechanism configured for securing the removable column holder with the column inside the cartridge slot, where the locking mechanism providing a force to the injector port pin and the detector pin configured for creating the first and second air tight seals between the injector port and the detector, respectively;
    wherein the locking mechanism including a mechanical latch with a lever configured to engage the cartridge slot for securing the removable column holder into the cartridge slot with the force to engage the sealing system.

19. A gas chromatograph device comprising:
a column configured for gas chromatography; and
a removable column holder housing the column configured to be removable from the gas chromatograph device with the column;
wherein, said column in the removable column holder including:
    an injector port pin connected to a first tip of the column at one end, the injector port pin is configured to provide a first air tight seal to an injector port of the gas chromatograph device; and
    a detector pin connected to a second tip of the column at its other end, the detector pin is configured to provide a second air tight seal to a detector of the gas chromatograph device;
wherein the removable column holder including a sealing system that allows gas flow from the injector port into the column via the injector port pin, and from the column into the detector via the detector pin configured to allow detection of compounds that may only be present in low levels;
wherein, said removable column holder including:
    a housing configured to contain the column in the removable column holder, where the housing containing the column inside with the injector port pin and the detector pin protruding therefrom;
    wherein, the housing is configured to keep a user from contaminating the first tip or the second tip of the column; and
wherein the housing further comprising:
    a plurality of holes, vents, slots, or combinations thereof configured for air flow through the column; and
    a tab configured for gripping the removable column holder to insert or remove the removable column holder from the cartridge slot, said tab protruding from an opposite side of the housing as the injector port pin and the detector pin.

* * * * *